United States Patent [19]

Nagao et al.

[11] Patent Number: 4,825,497
[45] Date of Patent: May 2, 1989

[54] DISC CLEANER

[75] Inventors: Tadasu Nagao, Fukuoka; Masaya Terayama, Izuka; Kazuhiko Inoue, Munakata, all of Japan

[73] Assignee: Kyushu Hitachi Maxell, Ltd., Fukuoka, Japan

[21] Appl. No.: 29,608

[22] Filed: Mar. 24, 1987

[30] Foreign Application Priority Data

| Mar. 24, 1986 | [JP] | Japan | 61-66872 |
| Apr. 12, 1986 | [JP] | Japan | 61-84820 |
| Apr. 12, 1986 | [JP] | Japan | 61-84821 |
| Jul. 11, 1986 | [JP] | Japan | 61-164248 |

[51] Int. Cl.<sup>4</sup> ............ G11B 3/58; B08B 11/02
[52] U.S. Cl. .................. 15/97 R; 360/137; 369/72
[58] Field of Search ......... 15/97 R, 21 R, 21 A, 15/21 B, 21 C, 21 E; 369/72; 360/137; 134/6

[56] References Cited

U.S. PATENT DOCUMENTS

| 4,561,142 | 12/1985 | Mischenko et al. | 15/97 R |
| 4,654,917 | 4/1987 | Yeung | 15/97 R |
| 4,713,856 | 12/1987 | Clausen | 15/97 R |

FOREIGN PATENT DOCUMENTS

| 1805422 | 5/1970 | Fed. Rep. of Germany | 15/97 R |
| 2236495 | 3/1973 | Fed. Rep. of Germany | 15/21 R |
| 116604 | 8/1985 | Japan. | |
| 1565305 | 9/1977 | United Kingdom. | |
| 2157877 | 10/1985 | United Kingdom. | |

*Primary Examiner*—Edward L. Roberts
*Attorney, Agent, or Firm*—Birch, Stewart, Kolasch & Birch

[57] ABSTRACT

A disc cleaner is disclosed. The disc cleaner includes a main casing, and a mounting structure located in the main casing to receive a disc to be cleaned. There is a lid operatively engaged with the main casing covering an upper surface of the main casing. A cleaner is mounted on an inner surface of the lid. A driving mechanism is located in the main casing. The driving mechanism is operated when the lid is positioned in a closed condition relative to the main casing. The driving mechanism is operatively connected to another mechanism for rotating and revolving the cleaner body to clean the disc.

35 Claims, 29 Drawing Sheets

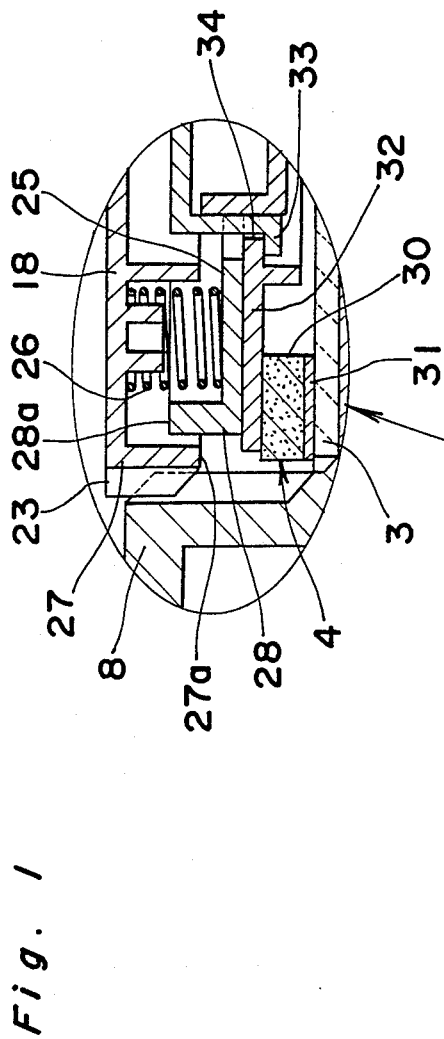
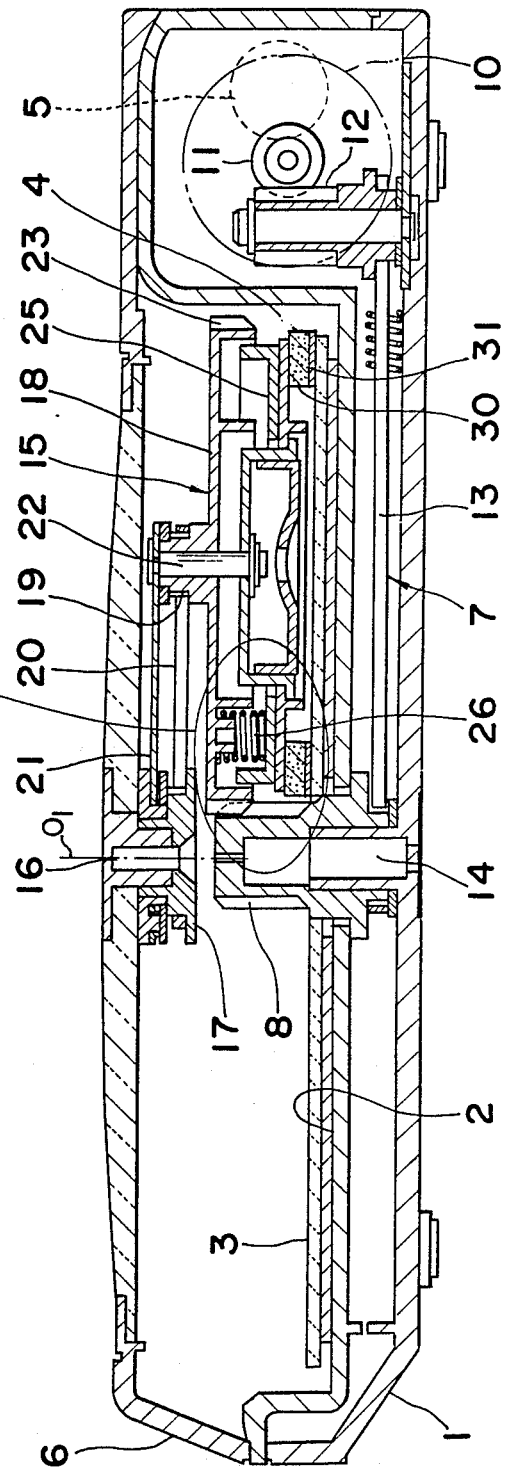
Fig. 1

DISC CLEANER

BACKGROUND OF THE INVENTION

The present invention relates to a disc cleaner which effectually wipes off dust or fingerprints, etc. from, for example, a digital audio disc (known commercially as a compact disc), an optical disc, etc.

For cleaning a digital audio disc, it is regarded as a taboo to wipe the disc off in the circumferential direction, and it is thought to be the correct manner to wipe the disc off in the diametrical direction. This is because pits carved in the disc in an elliptical shape are arranged in the line of the circumference of the disc. Therefore, even when the disc is wiped in the diametrical direction and a flaw or a scratch is formed on the surface of the disc, it only runs across the pits, which has little influence on the disc. On the contrary, when the disc is wiped in the circumferential direction thereof, the pits are affected and become to be defective, resulting in a lack of signals. Or, worse, adjacent pits may be flawed simultaneously all at one time.

Taking the above-described facts into consideration, a prior art disc cleaner which is arranged to wipe off the surface of the disc in the diametrical direction has already been proposed, for example, as shown in FIG. 38. According to this prior art device, an inner gear 540 and a planet gear 541, which revolves while rotating along the inner surface of the gear 540, constitute a cycloid mechanism in which any point on a ring-shaped cleaning pad 522 fixed to the planet gear 541 draws a trace or a locus P in the shape of a petal as the pad 522 wipes the surface of a stationary disc 503 (disclosed in the published specification of Japanese Utility Model Laid-Open No. 60-116604). The planet gear 541 is rotated by a driving gear 543 which is manually rotated.

Further, as shown in FIG. 37, another prior art disc cleaner of the above-described type has also been developed. The disc cleaner of FIG. 37 includes a mounting saucer 505 installed in a body casing 501 for placing a disc 503 thereon, a turntable 555 placed in the center of the mounting saucer 505, and a cleaner member 556 in the eccentric center of the mounting saucer 505, all of which are rotatably provided. In the aforementioned construction, when lid 502 is closed and a switch 557 is turned on, with the disc 503 put on the turntable 555 in the manner that its label surface faces up and the signal surface faces downward, the turntable 555 and the cleaner body 556 are rotated, so that the dust and dirt on the signal surface of the disc 503 can be wiped off by the cleaner member 556.

The cleaning pad 522 is attitude controlled by the utilization of the cycloid mechanism in the disc cleaner of FIG. 38, and accordingly, the entire cleaning mechanism is totally accommodated within the outline of the disc 503, resulting in the realization of a compact disc cleaner. On the other hand, since the rotation cycle of the cleaning pad 522 is extremely large in comparison with the revolution cycle thereof, the trace components along the circumferential direction of the disc 503 become increased, which will turn out to be a drawback in the case where the disc 503 is scratched. This results from the restrictions that the cleaning pad 522 is within a radius of the disc 503, and the rotational center of the planet gear 541 is positioned approximately at the center of the disc 503 in the radius of the disc 503, and consequently, the gear ratio of the inner gear 540 with respect to the planet gear 541 cannot be smaller than a specified predetermined value. In other words, the fact that the cleaning pad 522 is attitude controlled by the utilization of the cycloid mechanism of the inner gear type is disadvantageous from the viewpoint of obtaining a suitable trace of the pad.

Moreover, in the disc cleaner of FIG. 37, the turntable 555 and the cleaner member 556 are both placed at the side of the body casing 501, and therefore if the switch 557 is erroneously turned on, with the lid 502 being opened and the cleaner member 556 dropped on the disc 503 by mistake, it is feared that the disc 503 will be deformed or broken. There is also some fear in the prior art in handling of the disc. Further, the disc 503 is set on a mounting saucer 505 in the manner that the signal surface is turned down, while the label surface is turned up, and therefore, it is inconvenient according to the prior art, that how the signal surface is being cleaned cannot be confirmed during the cleaning of the disc 503. In addition, since the cleaning member 556 is disposed on the upper surface side of the body casing 501, the cleaning member 556 is undesirably easily covered with dust.

SUMMARY OF THE INVENTION

Accordingly, the present invention has been developed with a view to substantially eliminating the above-described disadvantages or inconveniences inherent in the prior art disc cleaners, and has for its essential object to provide a disc cleaner which is so arranged to improve the safety of the disc such that a cleaning member is not rotated before the lid is closed while and at the same time, the cleaning condition on the signal surface of the disc is capable of being confirmed during cleaning, with such arrangement that it is hard for the disc to be covered with dust.

Another object of the present invention is to provide a disc cleaner of the type described above which is arranged to prevent elements missing signals resulting from scratches by a cleaning pad, with simultaneous realization of a compact and miniaturized structure thereof.

A further object of the present invention is to provide a disc cleaner of the above-described type in which the operational structure of a switch for driving a motor is improved so as to prevent an erroneous operation of the motor, with simultaneous achievement of a simplified structure and reduced manufacturing cost.

Still a further object of the present invention is to provide a disc cleaner of the above-described type which is so arranged that the cleaner member can be separated away from the disc after completion of the cleaning without any waste or lines remaining on the surface of the disc.

Yet, a further object of the present invention is to provide a disc cleaner of the above-described type which provides uniform cleaning through stabilization of the pressure by the cleaning member against the disc, and at the same time, is adapted to avoid the transposition of dust once wiped off by the cleaner member onto the disc, by the exchange of the cleaning member.

Yet another object of the present invention is to provide a disc cleaner of the abovedescribed type in which the positional arrangement of the cleaner body with respect to the signal surface of the disc is devised on the mounting platform so that the disc can be always pressed horizontally, with no inclination, thereby achieving a uniform cleaning of the disc.

Still another object of the present invention is to provide a disc cleaner of the above-described type in which the structure of the cleaning body is improved, so that the signal surface of the disc is wiped off as effectively and reliably in various directions.

In accomplishing these and other objects, according to one aspect of the present invention, there is provided a disc cleaner which is comprised of a body casing having a mounting saucer for placing a disc thereon, and a lid for covering the mounting saucer.

In addition, a drive source is accommodated in the body casing, and an output terminal which is rotated by the drive source is exposed to the side of the mounting saucer. On the other hand, at the side of the lid, the disc cleaner is further provided with a cleaner member for cleaning the disc, and a rotating mechanism which transmits the rotation of the output terminal to the cleaner member. It is so arranged that the output terminal is released from engagement with the rotating mechanism when the lid is opened, while the output terminal is engaged with the rotating mechanism by closing the lid. It is to be noted here that the disc mentioned above is, for example, a compact disc, an optical disc, a compact disc-ROM, a magnetic disc, etc.

The lid may be pivotably coupled at its one part to the body casing by a shaft or the like. Therefore, when the lid is to be opened or closed, the lid is rotated around the shaft. Or, the lid can be opened or closed through detachment from or attachment to the body casing.

Although it is preferable that the disc is fixedly secured onto the mounting saucer, it is not restricted to this configuration. Moreover, it is freely decided whether the mounting saucer is fixed to the body casing or whether the mounting saucer is so placed on a mounting stand rotatably supported by the body casing as to be a rotary type.

In the disc cleaner having the above-described construction, when the lid is closed, the rotating mechanism for the cleaning member is engaged with the output terminal, such that the rotation of the output terminal is transmitted to the cleaner member through the rotating mechanism. Accordingly, the cleaner member is rotated, and the signal surface of the disc placed on the mounting saucer at the side of the body casing is cleaned. At this time, because the signal surface of the disc is turned up, the cleaning condition of the disc can be confirmed from the outside through a window. Thereafter, when the lid is opened, the rotating mechanism is disengaged from the output terminal. Since the cleaner member is provided at the side of the lid, the cleaner member is not rotated, and accordingly, even when the disc is erroneously dropped onto the mounting saucer, the disc is free from being flawed by the cleaner member.

According to another aspect of the present invention, the disc cleaner is so arranged that while the disc is rested, a cleaning pad, while rotating around the center of revolution which is set at the center of the disc, revolves so as to clean the disc. Moreover, the cleaning pad is attitude controlled by a kind of cycloid mechanism from the viewpoint of structural principle. The disc cleaner of this embodiment is fundamentally different from the prior art cleaner mentioned above in that the rotation cycle and the revolution cycle of the cleaner member are determined so that the cleaning pad draws such trace P every one rotational cycle that a terminal of the trace is positioned in the peripheral edge of the disc and approximately opposite to a starting point set in the peripheral edge of the disc, and more preferably, in such a manner that, supposing that a diametrical line of the disc passing through the starting point is a boundary line, the terminal is positioned in the circumferential edge of the disc and opposite to the starting point, with the boundary line intermediately sandwiched therebetween.

More specifically, the rotational cycle of the cleaning member is determined to be 4 or less than 4 per one revolutional cycle. In order to achieve this result, a sun gear is secured onto the center of the revolution, with a planet gear being fixed on the center of the rotation of the cleaning pad. Thereafter, a timing belt is connected between the sun gear and the planet gear. In other words, the gear ratio between the two gears can be set to be small by using the timing belt as a transmission medium, thereby to make the rotational cycle small.

It is possible to variably change the continuous shape of the trace to be, for example, an elliptical shape or a polygonal shape by changing the rotational cycle and the revolutional cycle of the cleaning member respectively. In a preferred embodiment, the rotational cycle of the cleaning member should be so determined that the continuous shape of the trace does not form a closed loop after completion of one revolution of the cleaning member. In other words, the phase of the trace should shift every one revolution of the cleaning pad in the circumferential direction, thereby to prevent the surface of the disc from remaining dirty.

The rotational center of the cleaner member describes a circular trace when the cleaner member revolves. Accordingly, if the cleaning pad is provided at the center of the rotation of the cleaner member, the pad comes to wipe off the surface of the disc in the circumferential direction of the disc. Therefore, in order to avoid this phenomenon, the cleaning pads are arranged in a circular shape around the rotational center. The cleaning pad may be a ring-shaped single body or may be such that several pads are aligned into a circular configuration. Moreover, it is not necessarily required that the cleaning pad is coaxial with the rotational center of the cleaner member, and the center of the circle of the cleaning pads may not coincide with the rotational center of the cleaner member.

According to the aforementioned construction, since the trace of the cleaning pad is set in such a manner that the starting point of the trace is approximately opposite to the terminal in the circumferential edge of the disc, almost any portion in the trace can follow the diametrical direction of the disc. Therefore, even in the case where the surface of the disc is flawed for some reason, an erroneous reading of the signals or generation of noises can be avoided.

Furthermore, since it is so constructed that the cleaner member is attitude controlled in the manner that it revolves while rotating around the revolutional center at the center of the disc, the attitude controlling mechanism does not protrude to a large degree from the contour of the disc. Therefore, the disc cleaner as a whole can be compact in size.

The above-described object of the present invention is accomplished on the assumption that a covering which covers the mounting saucer of the disc is provided with the main body so as to be selectively opened and closed. Within the main body is disposed a switch for controlling the supply of electricity to the motor in such a condition as not to be operable directly from outside. The switch is manipulated through an operating member provided at the side of the covering. The switch cannot be in a waiting state in which it can be switched until the covering is closed.

For example, the switch is provided inside the main body and the operating member is provided with the covering so that the switch is turned on or off when the covering is closed. The operating member is so supported as to freely protrude from or withdraw in the covering. When the covering is closed, an operating pin of the operating member protrudes into the main body to be above an operating element of the switch. It is preferable that the operating member is urged in the waiting posture by a spring.

The switch may be a non-contact type.

Thus, the switch is so provided within the main body separately from the operating member as not to be operable directly from the outside, while the operating member for turning the switch on or off is fitted in the covering. Consequently, so long as the covering is not brought into a closed posture, the switch cannot be operated. Therefore, by way of example, an erroneous operation of the switch when the disc is put in or taken out of the main body, with the covering being opened, can be prevented. Moreover, since the switch can be operated only when the covering is closed, there is no need for a special switch to be separately provided for detecting the closed condition of the covering. Thus, whether the motor should be started or not after the covering is closed can be detected in a simplified manner.

The disc cleaner according to the still further aspect of the present invention is comprised of a body casing which has a mounting saucer for mounting a disc thereon, a lid for covering the mounting saucer, a disc cleaning member provided at the side of the lid, a driving means for rotating the disc cleaning member and a switch for turning the driving means on or off. In the disc cleaner mentioned above, the switch is adapted to be unable to be turned off before or immediately before the lid is opened to such a degree as to separate the disc cleaning member from the disc, after the switch is turned on. In other words, after cleaning, as the lid is opened, the disc cleaner member is kept rotating until the cleaning member is separated from the disc. Namely, the disc cleaning member is detached from the disc while it is rotated. It is to be noted that the reason why the switch cannot be turned off (including immediately before the lid is opened to such a degree as has been mentioned) above is that the disc cleaning member can be detached from the disc while it is still rotated by inertia even after the switch is turned off before the lid is opened to such a degree.

The switch having the aforementioned arrangement can be embodied in the following manner. For example, the lid is provided with a lock means so that the lid is locked in the closed condition. Consequently, the release of this lock means causes the lid to be opened to such a degree as to separate the disc cleaning member from the disc. Then, or immediately before the lid is opened to such a degree as above, the switch becomes able to be turned off for the first time. Thus, according to the above-described arrangement, the cleaning member is detached from the disc, in accordance with the opening of the lid, while the cleaning member is being rotated, and therefore, the dust once wiped off by the cleaning member never remains on the surface of the disc, thereby to accomplish an effective cleaning.

The disc cleaner further includes a first elastic member. The cleaner member for cleaning the disc on the mounting saucer is supported at the side of the inner surface of the lid through the first elastic member so as to be vertically movable. More specifically, a rotary disc is supported on the inner surface of the lid, and a fitting plate is provided at the lower surface side of the rotary disc. The fitting plate for fitting the cleaner member is also vertically movable. The first elastic member is interposed between the rotary disc and the fitting plate so that the fitting plate is urged downwards. Further, the cleaner member is detachably provided at the lower surface side of the fitting plate.

The lid may be pivotally connected at its one part to the body casing through a shaft or the like. Therefore, when the lid is opened or closed, the lid is rotated around the shaft. It may also be possible that the lid is attached to or detached from the casing when it is desired to be closed or opened.

In addition, the cleaner member can be formed by a single body such as porous and fluffy urethane or sheepskin, which is superior in cleaning efficiency and high in durability, and produces less damage to the disc. It is more preferable, however, that the cleaner member is provided with a second elastic member for adding elasticity thereto, from the viewpoint of improving the cleaning effects.

For the first and second elastic members, a coiled spring, a leaf spring or rubber, etc. can be employed.

In the disc cleaner having the above-described construction, when the lid is closed, with the disc put on the mounting saucer, the cleaner member which receives the downward urging force by the first elastic member is brought into contact with the surface of the disc always uniformly at a specific pressure, such that the entire surface of the disc can be wiped off uniformly and equally.

Moreover, when the cleaner member becomes dirty, it can be taken off from the fitting plate for exchange with a new one. Therefore, according to the disc cleaner of the present invention, the disc can be prevented from being soiled by a dirty cleaner member.

In accomplishing another important object, according to the present invention, the disc is placed on the mounting saucer of the body casing. The cleaner member which rotates while revolving on the signal surface of the disc is disposed in such a manner that the rotational center of the cleaner member is eccentric with respect to the center of the disc, which center of the disc is positioned within the area of the rotation of the cleaner member.

It is to be noted there that the aforementioned disc is such as a compact disc, an optical disc, a compact disc-ROM, or a magnetic disc, etc.

The above-described cleaner member has a plurality of protruding cleaning members so provided as to extend in a radial direction from the rotational center. It does not matter whether the protruding cleaning members form a continuous union, or if they are formed independently from each other; nor does it matter whether the cleaner member is, in itself, a single body having a loop configuration or a disc configuration.

Moreover, the disc may be fixedly positioned in a stationary condition on the mounting saucer, or it may be rotated on the mounting saucer.

When the disc is fixedly positioned on the mounting saucer, it is better that the mounting saucer is laid with a mat made of a material having a high frictional coefficient and pliability, for example, chamois leather or rubber, so as to prevent the disc from slipping or being flawed. However, it is not always required.

The rotation and the revolution of the cleaner member may be carried out either manually or automatically.

In the foregoing arrangement, the cleaner member is revolved while being rotated on the signal surface of the disc, such that the signal surface of the disc is cleaned in the diametrical direction of the disc. In this case, the center of the disc is within the area of the rotation of the cleaner member, that is, the cleaner member is pressed into contact with the signal surface of the disc in a manner to step over the center of the disc in the diametrical direction, and consequently, the disc can be wiped off in a horizontally-maintained position on the mounting saucer. Therefore, the disc is adapted to be pressed by the cleaning surface of the cleaner member with uniform pressure to be effectively cleaned.

More specifically, the disc is put on the mounting saucer of the main body casing. The cleaner body which rotates while revolving on the signal surface of the disc is disposed in such a manner that the rotational center of the cleaner member is eccentric with respect to the center of the disc, which center of the disc is positioned within the area of the rotation of the cleaner member. The cleaner member has a plurality of protruding cleaning members so provided as to extend in a radial direction from the rotational center.

In the disc cleaner having the above-described construction, the cleaner member is arranged to rotate while revolving on the signal surface of the disc which is accordingly cleaned in the diametrical direction thereof. At this time, since the center of the disc is found within the rotational area of the cleaner member, that is, the cleaner member is pressed into contact against the signal surface in such a manner as to step over the center of the disc in the diametrical direction, the disc is always maintained horizontally on the mounting saucer during cleaning. Accordingly, the disc can be effectively cleaned with uniform pressure added by the cleaning surface of the cleaning member. Furthermore, a plurality of protruding cleaning members which extend radially from the center of the rotation of the cleaner member draw a trace different from each other, and therefore, the dirt can be wiped off the disc from various directions, thereby enhancing the cleaning efficiency.

BRIEF DESCRIPTION OF THE DRAWINGS

These and other objects and features of the present invention will become apparent from the following description taken in conjunction with the preferred embodiments thereof with reference to the accompanying drawings, in wherein:

FIG. 1 is a vertical cross sectional view of a disc cleaner, with a lid being closed, according to a first embodiment of the present invention;

DETAILED DESCRIPTION OF THE INVENTION

Figure 2:
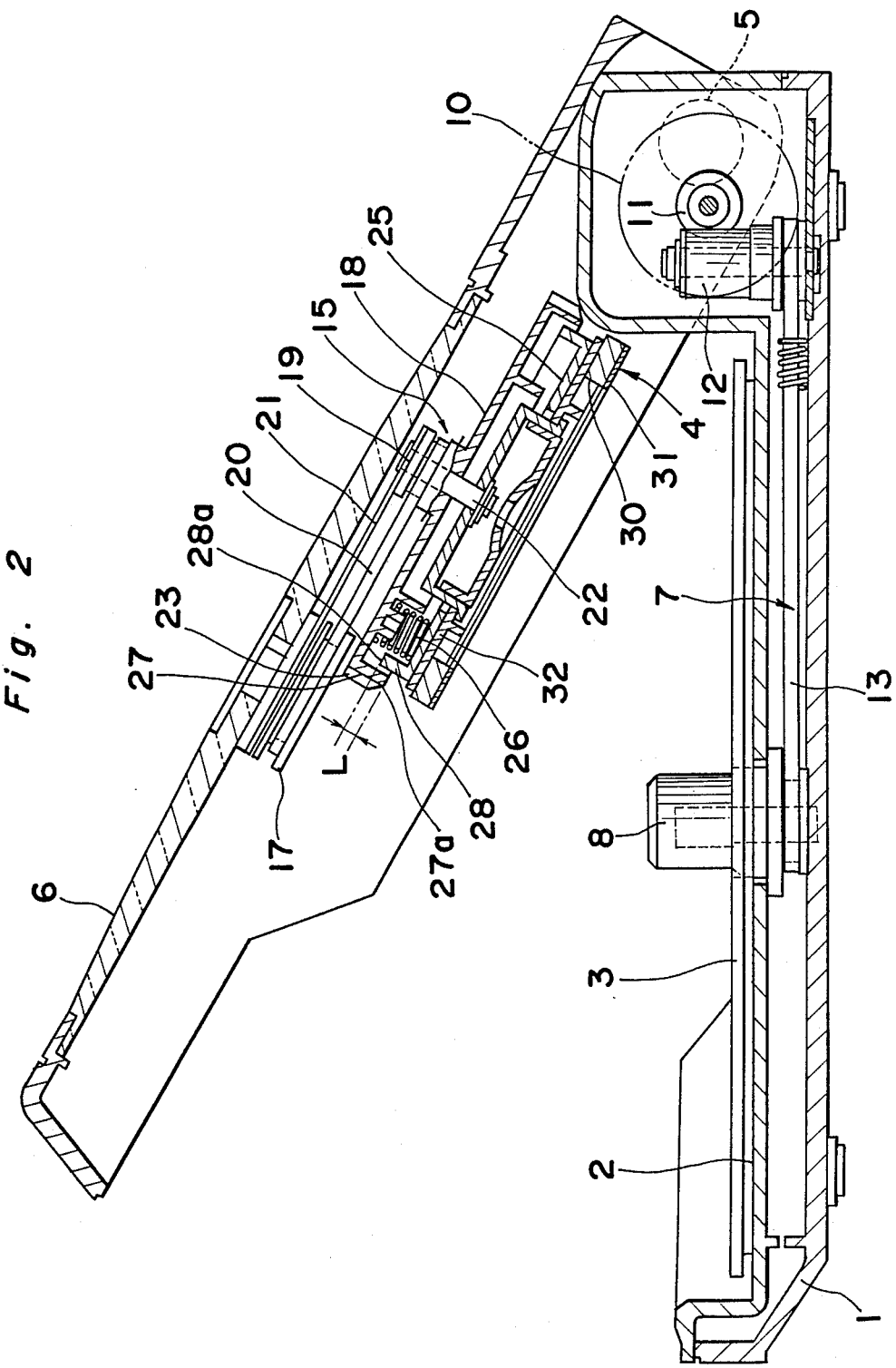
FIG. 2 is a vertical cross sectional view of the disc cleaner of FIG. 1, with the lid being opened.

Before the description of the present invention proceeds, it is to be noted that like parts are designated by like reference numerals throughout the accompanying drawings, the description of which will therefore not be repeated for the sake of brevity.

First Embodiment

Referring first to FIGS. 1 through 6, a disc cleaner according to a first embodiment of the present invention will be described.

Figure 3:
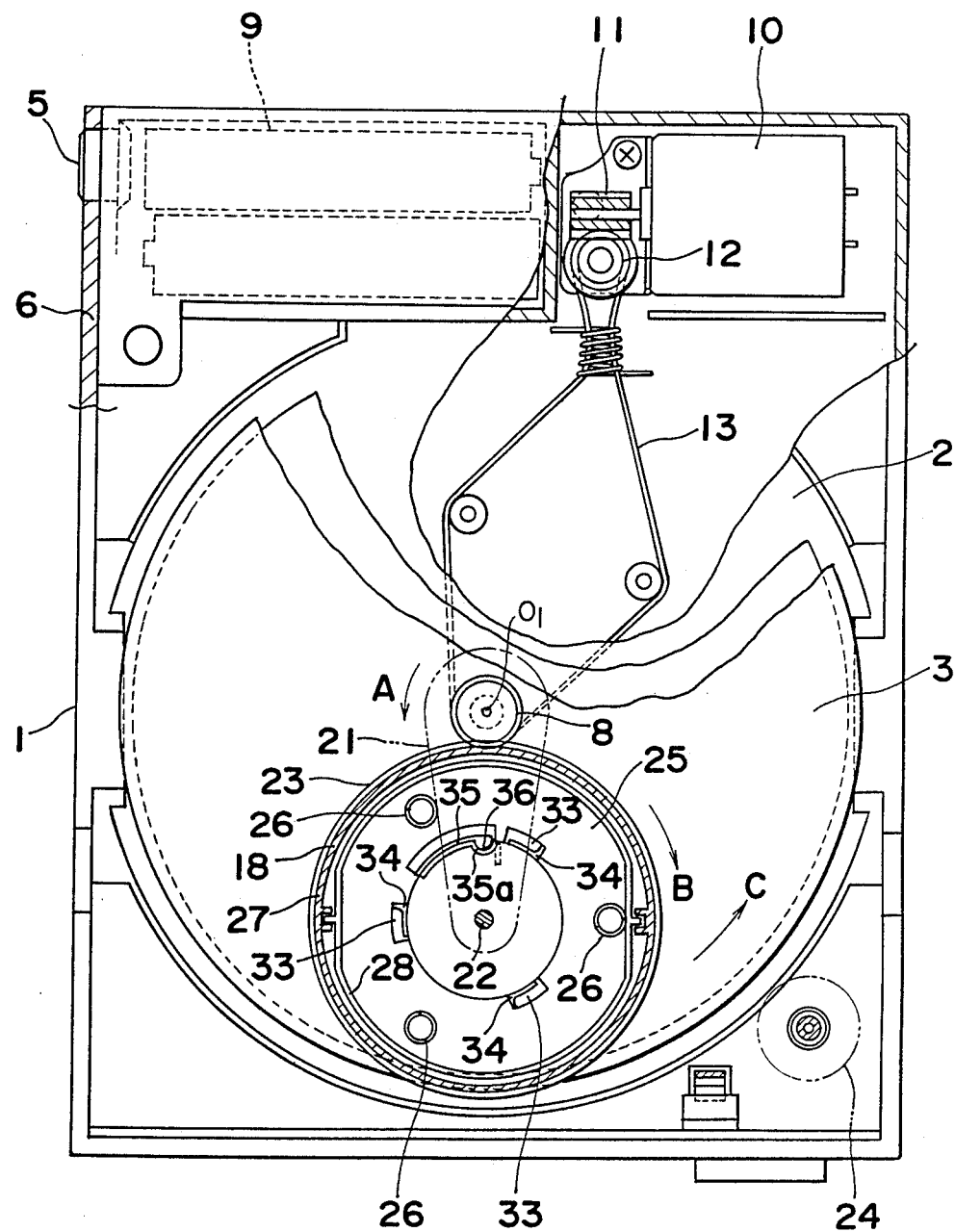
FIG. 3 is a plane view of the disc cleaner of FIG. 1, with the lid removed.

In the disc cleaner shown in FIGS. 1 through 3, a disc 3 is placed on a disc receiving saucer 2 which is recessed in the upper surface of a main casing 1. As the upper surface of the disc 3 is wiped off by a cleaner body 4, the disc 3 is still secured on the receiving saucer 2.

The cleaner body 4 is supported on the inner surface of a lid 6 which fully covers the upper surface of the main casing 1 and is openable or closable, and rotatable around a shaft 5. The cleaner body 4 is rotated by a driving mechanism 7 provided at the side of the main casing 1 only in the condition that the lid 6 is closed. In other words, a switching button 24 provided with the lid 6 can turn on a driving switch for the driving mechanism 7 in the main casing 1 only when the lid is closed.

The driving mechanism 7 includes a motor 10 which is driven by a battery 9, and a driving gear 8 projecting from the center of the mounting saucer 2. The power of the motor 10 is transmitted to the driving gear 8 through a timing belt 13 connected between the driving gear 8 and a worm gear 12 engaged with a worm 11 on a motor shaft. The driving gear 8 is rotatably supported around a gear shaft 14 fixed perpendicularly onto the inner surface of the main casing 1.

Upon receiving the rotation of the driving gear 8, the cleaner body 4 is rotated, while revolving, by a rotating mechanism 15 provided on the inner surface of the lid 6.

The above-described rotating mechanism 15 is comprised of a plastic sun gear 17 secured by a screw 16 approximately at the center of the inner surface of the lid 6, a plastic rotary disc 18, and a planet gear 19 integrally projecting out of the center of the upper surface of the rotary disc 18, and a timing belt 20 connecting the sun gear 17 with the planet gear 19. The rotating mechanism 15 further includes a supporting plate 21 made of metallic material so that the rotary disc 18 is rotated around the center of the sun gear 17, namely, around the revolution center $O_1$ which comes on the central line of the disc 3 when the lid is closed. An end of the supporting plate 21 is rotatably inserted through over the sun gear 17, and another end of the supporting plate 21 has a supporting pin 22 projected downwards. The planet gear 19 is rotatably supported by the pin 22.

Since the rotating mechanism 15 is driven by the driving gear 8 as is described earlier the driving gear 8 is arranged to be engaged with an input gear 23 formed in the outer peripheral edge of the rotary disc 18 when the lid 6 is closed.

Referring to FIG. 3, when the driving gear 8 is rotated in the counterclockwise direction, the rotary disc 18 rotates in the clockwise direction B around the supporting pin 22. Simultaneously, the planet gear 19 which is integrally formed with the rotary disc 18 is rotated in the clockwise direction B, while rotating the timing belt 20 relative thereto, and accordingly, the rotary disc 18 is revolved in the counterclockwise direction C. In other words, the direction of the rotation of the rotary disc 18 is opposite to that of the revolution thereof.

The cleaner body 4 is mounted at the lower surface side of the rotary disc 18 through a mounting plate 25. The mounting plate 25 is supported at the lower end of the supporting pin 22 in such a manner as to be vertically movable, and at the same time, not to slip out of the supporting pin 22. Moreover, there are inserted first elastic members 26 of a coiled spring between the mounting plate 25 and the rotary disc 18. Due to the elasticity of the first elastic member 26, the mounting plate 25 is always urged downwards above the supporting pin 22. The cleaner body 4 is installed at the lower surface side of the mounting plate 25, and is so arranged as to be brought into contact with the surface of the disc 3 at a predetermined pressure because of the urging force of the first elastic member 26 when the lid 6 is closed.

As is seen from FIG. 3, the first elastic members, 26 are spaced the same distance from each other in the circumferential direction thereof between the rotary disc 18 and the mounting plate 25 opposite to the disc 18.

The rotary disc 18 has a surrounding wall 27 formed along the outer peripheral edge of the lower surface thereof so as to surround the outer periphery of the first elastic member 26. On the other hand, the mounting plate 25 has a surrounding wall 28 formed along the outer peripheral edge of the upper surface thereof. The surrounding wall 28 is smaller in inner diameter than the surrounding wall 27, such that the surrounding wall 28 is fitted inside the surrounding wall 27. Accordingly, even when the mounting plate 25 is the farthest away from the rotary disc 18 by the elasticity of the first elastic member 26, an upper end portion 28a of the surrounding wall 28 does not come off from a lower end portion 27a of the surrounding wall 27, but the two end portions 28a and 27a overlapped with each other. The overlapping volume L of the end portions 28a and 27a is indicated in FIG. 2.

Due to the aforementioned arrangement of the surrounding walls 27 and 28, such inconveniences that dust may break into the interval between the rotary disc 18 and the mounting plate 25 or that powdered dust to be produced when the first elastic member 26 is rubbed by the rotary disc 18 or the mounting plate 25 may fall onto the disc 3 can be eliminated. Moreover, fears that the interval between the rotary disc 18 and the mounting plate 25 may be forced open by a driver or the like can be also removed.

The surrounding wall 27 of the rotary disc 18 has the aforementioned input gear 23 formed in the outer periphery thereof, and accordingly, the surrounding wall 27 serves also as a transmission medium.

The cleaner body 4 is formed with a cleaning layer 31 at the lower surface of a circular second elastic member 30. The second elastic member 30 is made of, e.g., a cellular plastic or sponge rubber, the elasticity of which is set to be larger than that of the first elastic member 26. For the cleaning layer 31, sheets of porous and fluffy urethane or sheepskin, etc. are employed. The cleaning layer 31 is attached to the lower face of the second elastic member 30.

Figure 4:
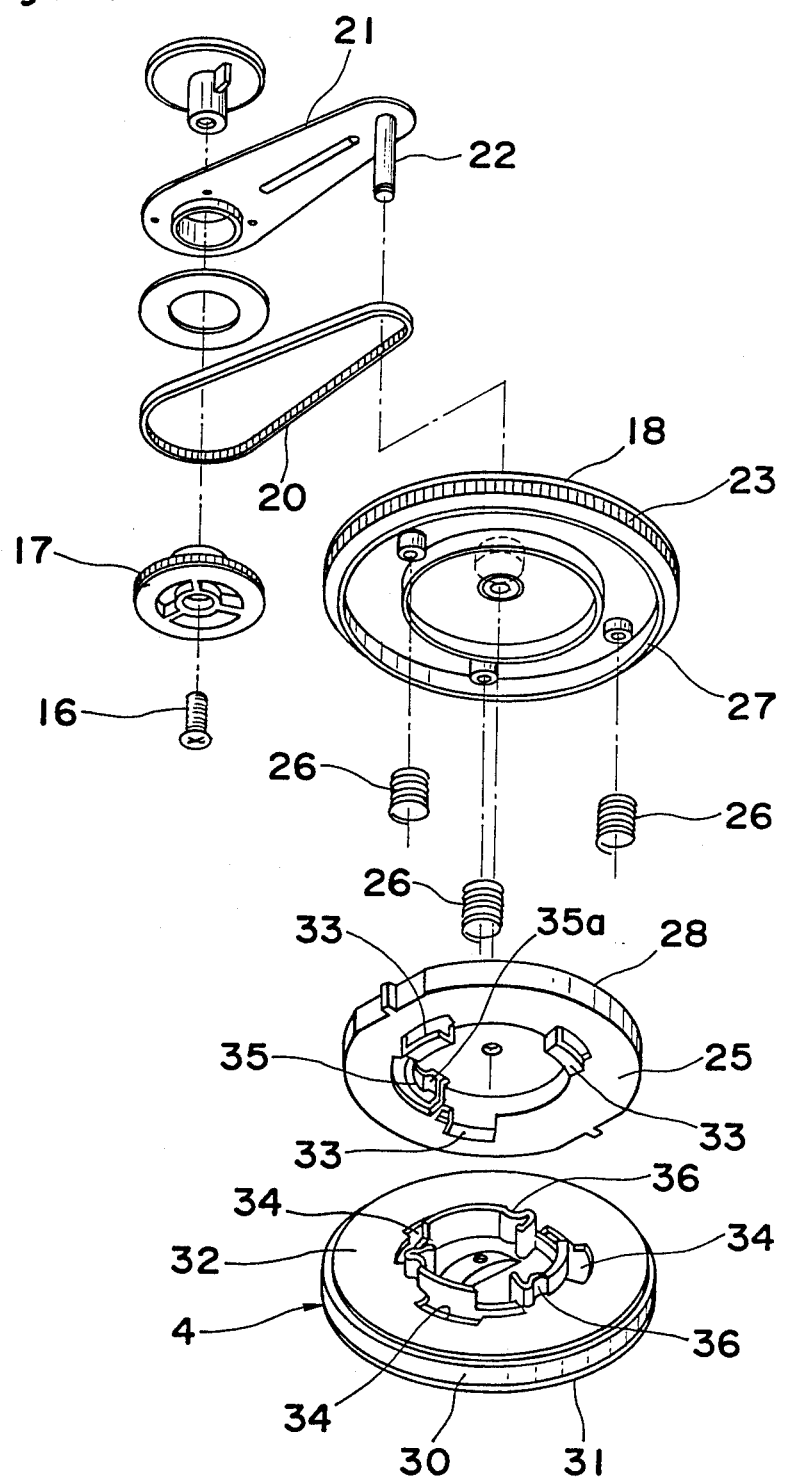
FIG. 4 is an exploded perspective view of a cleaner body and a rotating mechanism thereof of the disc cleaner of FIG. 1.

Although the cleaner body 4 is detachably provided at the lower surface side of the mounting plate 25, it can be carried out easily because a plastic cleaning base 32 is applied to the upper surface of the second elastic member 30, and the cleaning base 32 is detachably connected to the lower surface of the mounting plate 25 through a bayonet coupling means. The bayonet means has, as shown in FIGS. 3 and 4, an engaging claw 33 at the lower surface of the mounting plate 25. The engaging claw 33 is engaged with a recessed groove 34 formed in the cleaning base 32 as the cleaning base 32 is rotated. Furthermore, in order to ensure that the cleaning base 32 is prevented from being loosely rotated, the mounting plate 25 is provided with a moderate arm 35, the elasticity of which can be varied, and the cleaning base 32 is formed with a recess 36 which is to be engaged with a projection 35a at the tip of the moderate arm 35 simultaneously with the bayonet coupling of the cleaning base 32 and the mounting plate 25.

Figure 5:
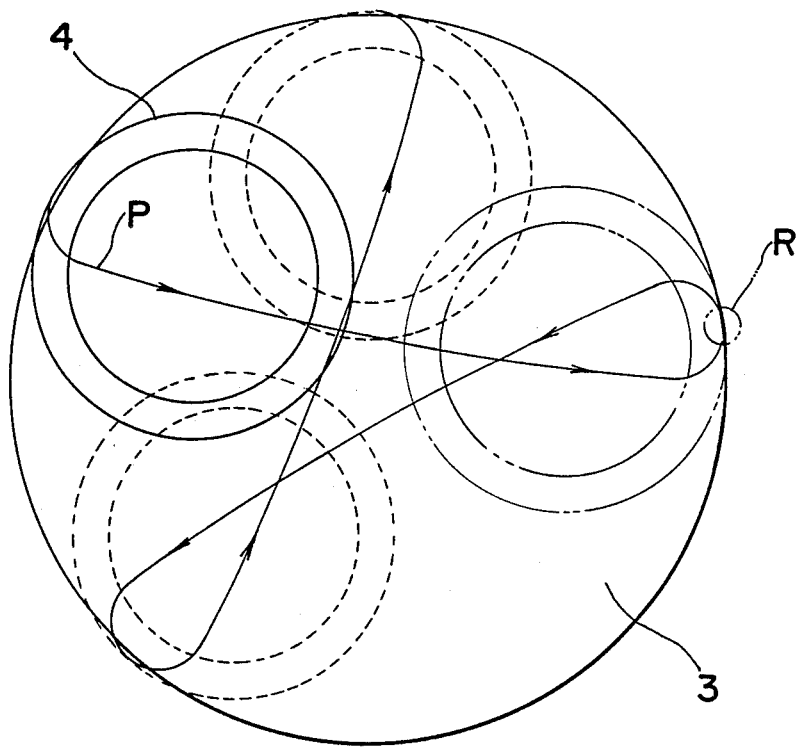
FIG. 5 is a plane view showing the trace drawn by the moving cleaner body of FIG. 4.
Figure 6A:
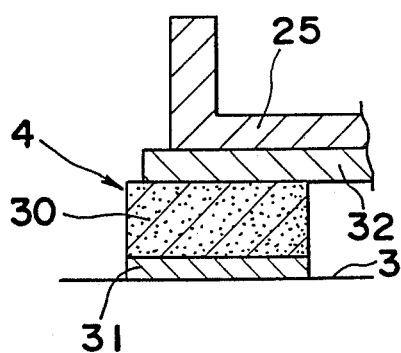
FIGS. 6(a) and 6(b) are cross sectional views respectively showing how the shape of the cleaner body is changed when the disc cleaner is operated.
Figure 6B:
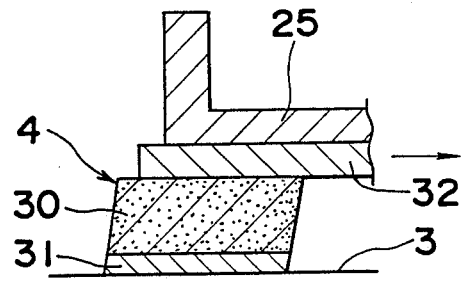

In the construction as described above, the cleaner body 4 mounted on the mounting plate 25 revolves around the center of the sun gear 17, and at the same time, rotates around the supporting pin 22 by the rotating mechanism 15. For example, supposing that the gear ratio of the sun gear 17 with respect to the planet gear 19 is set to be approximately 2.3:1, the cleaner body 4, drawing a trace P of cycloid curve as shown in FIG. 5, wipes off the surface of the disc 3. At this time, the cleaner body 4 slides in contact with the disc 3 as shown in FIG. 6(a), and the cleaner body 4 bends the second elastic member 30 as shown in FIG. 6(b), generating a time lag between the cleaning layer 31 and the mounting plate 25, and resulting in improvement of the cleaning effect. When the cleaner body 4 is found at a position R near the outer peripheral surface of the disc 3 where the cleaner body is reversed as shown in FIG. 5, the cleaner body 4 moves little and therefore the disc 3 is apt to be cleaned less effectively. Considering the above-described disadvantage, if the second elastic member 30 is bent by the cleaner body 4 to produce the time lag, the cleaning effects can be improved.

Figure 7:
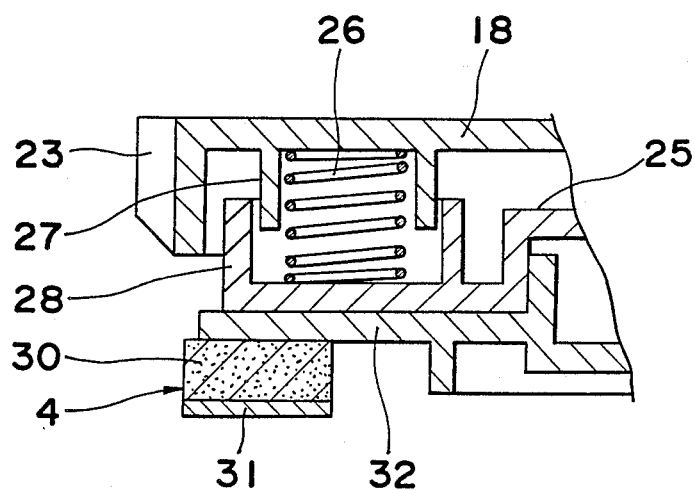
FIG. 7 is a cross sectional view of a part of the disc cleaner where a first elastic member is inserted according to a modification of the first embodiment.

Although the surrounding walls 27 and 28 respectively formed along the outer peripheral edge of the rotary disc 18 and the mounting plate 25 in the facing interval between the rotary disc 18 and the mounting plate 25 are adapted to commonly surround the outer peripheries of a plurality of the first elastic members 26 according to the foregoing embodiment, the surrounding walls 27 and 28 may be respectively assigned one for each elastic member 26 as shown in FIG. 7.

Figure 8:
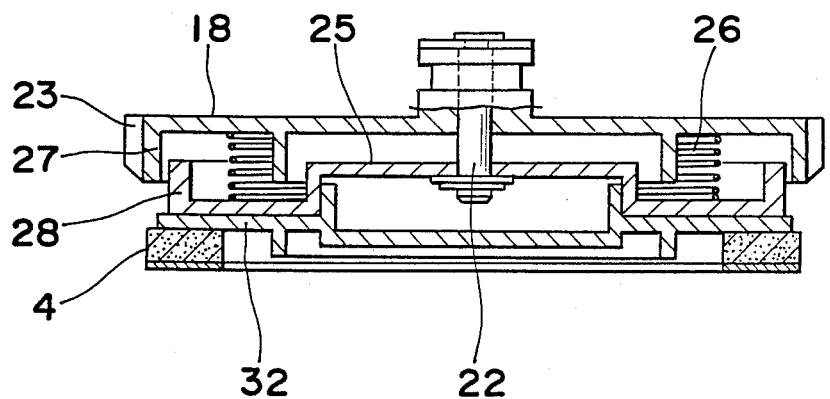
FIG. 8 is a cross sectional view showing how the first elastic member is inserted in the disc cleaner according to another modification of the first embodiment of the present invention.

The first elastic member 26 may be a single coiled spring, as illustrated in FIG. 8, which surrounds the supporting pin 22 in the facing interval between the rotary disc 18 and the mounting plate 25 opposed to the rotary disc 18.

Furthermore, although the surrounding wall 27 is used also as a transmission medium in the foregoing embodiment because the surrounding wall 27 is formed with the input gear 23 in the outer periphery thereof to be directly engaged with the driving gear 8, the rotation of the rotary disc may be transmitted to the driving gear 8 through a friction belt, and in this case, the outer peripheral surface of the surrounding wall 27 is used also as a winding surface of the belt.

As is described above, according to the disc cleaner of the first embodiment of the present invention, the cleaner body 4 is mounted on the mounting plate 25 which is so supported on the inner surface of the lid 6 through the first elastic member 26 as to be vertically movable, and therefore, the cleaner body 4 is always pressed into contact with the disc 3 stably at a specific pressure, resulting in uniform cleaning of the disc without an partly uncleaned portion remaining. Moreover, the cleaner body 4 is detachably mounted on the mounting plate 25, and accordingly, the cleaner body is able to be advantageously exchanged with a new one as necessary.

SECOND EMBODIMENT

A disc cleaner according to a second embodiment of the present invention will be described with reference to FIGS. 9 through 13.

Figure 9:
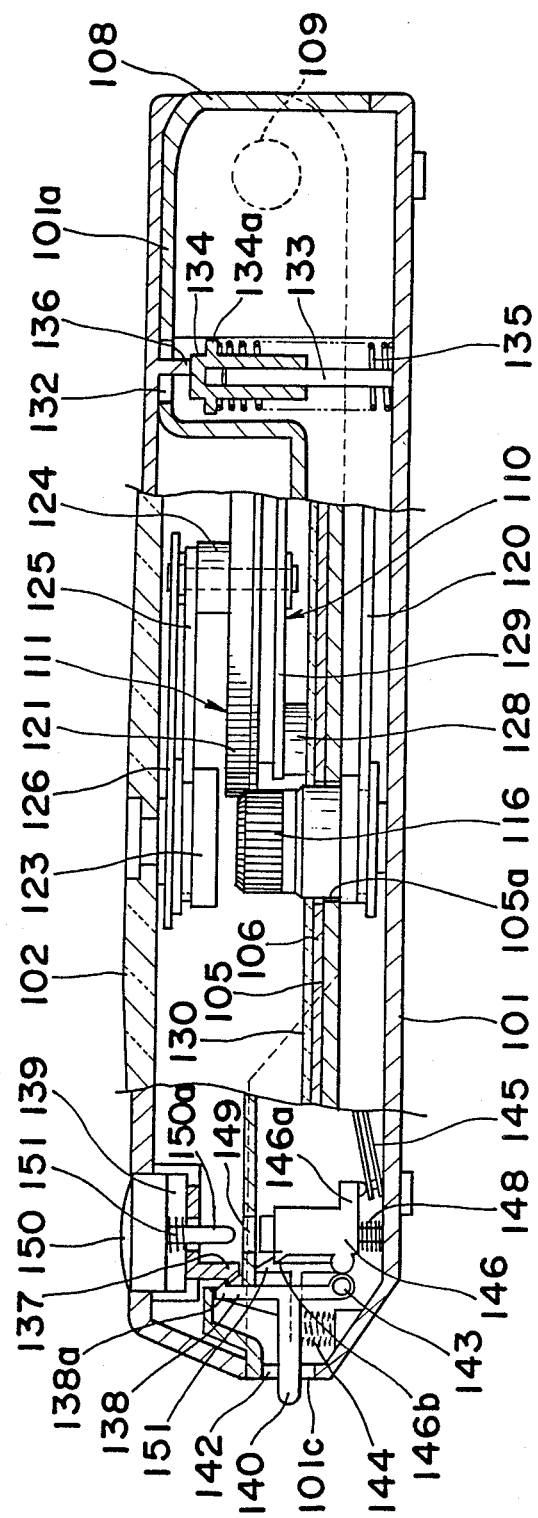
FIG. 9 is a vertical cross sectional view of a disc cleaner according to a second embodiment of the present invention, with the lid being closed.
Figure 10:
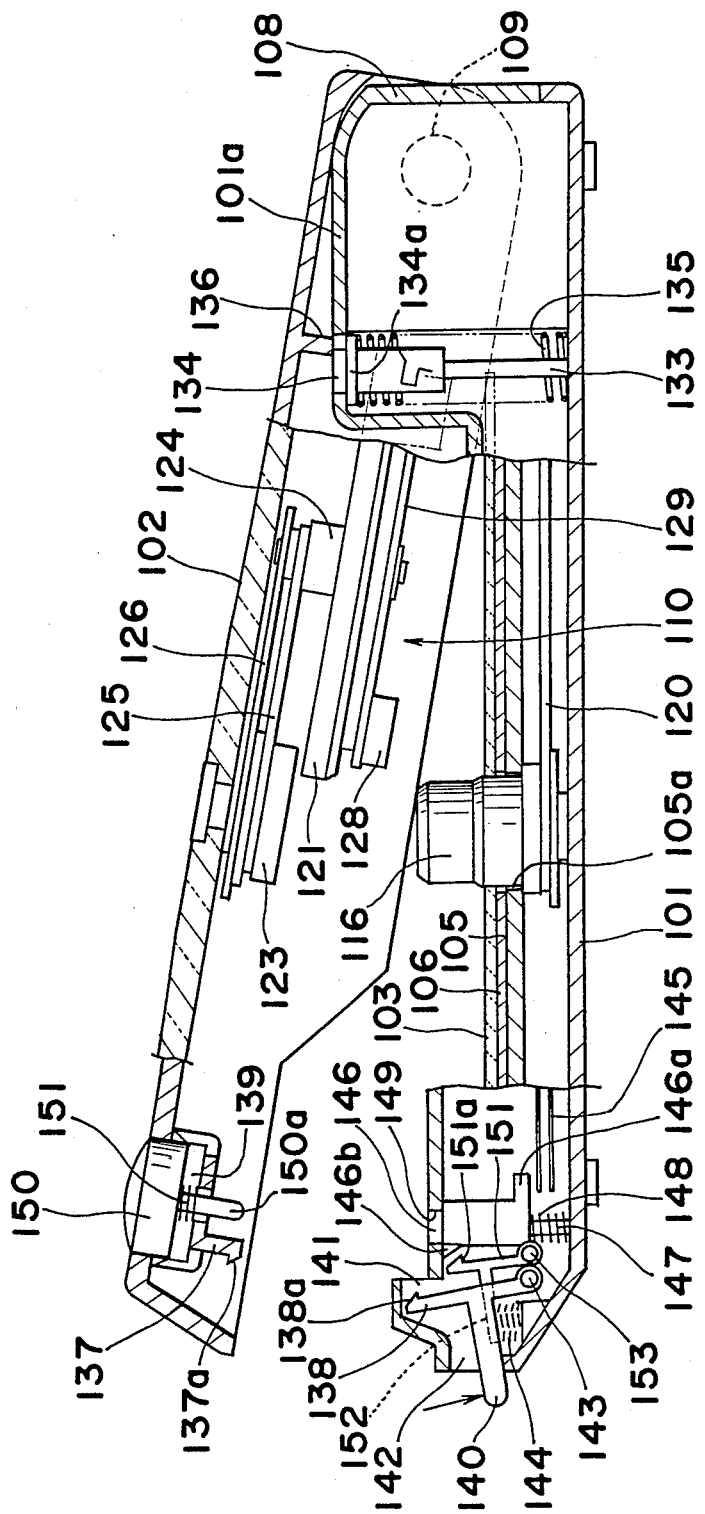
FIG. 10 is a vertical cross sectional view of the disc cleaner of FIG. 9, with the lid being opened.
Figure 11:
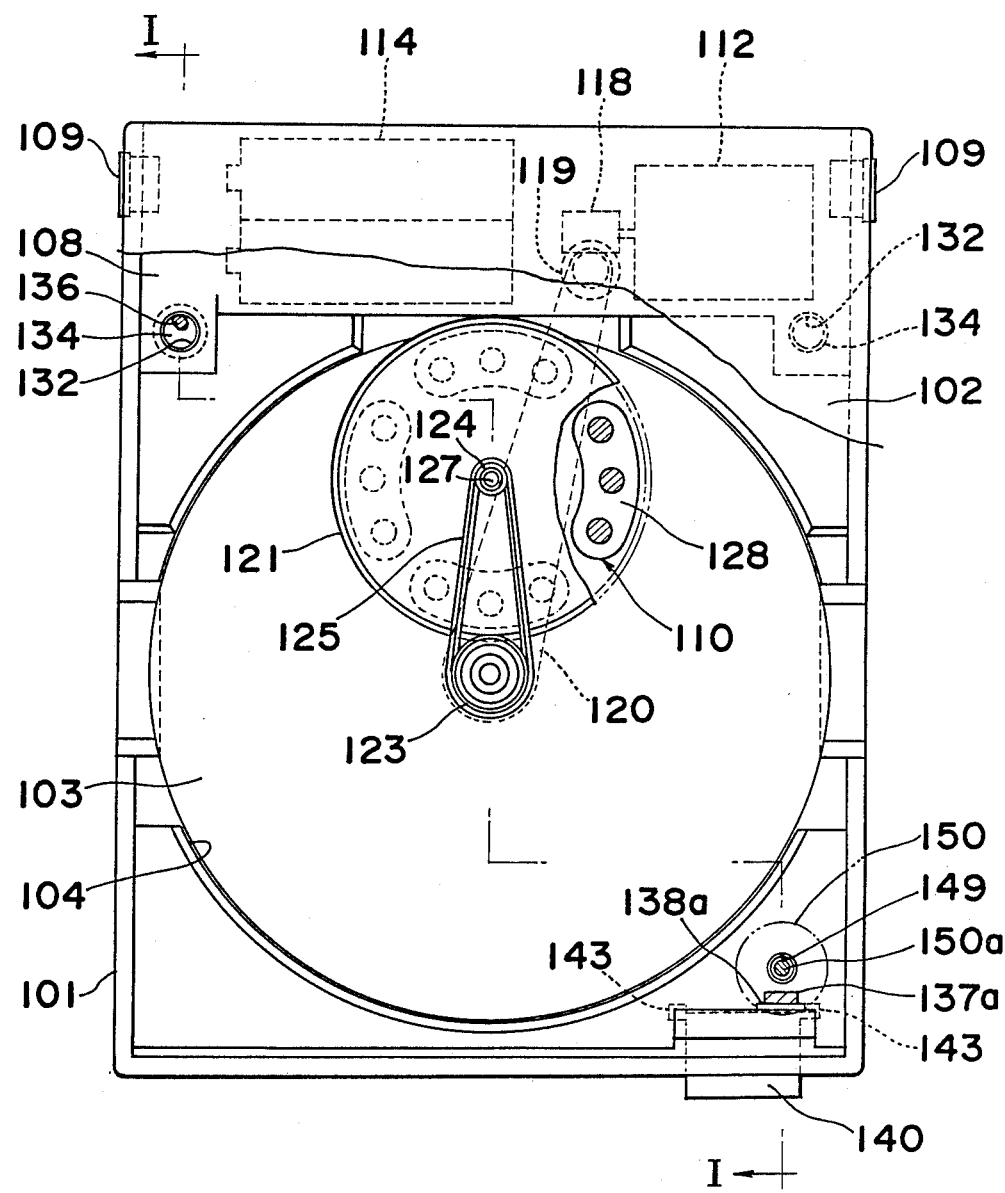
FIG. 11 is a plane view showing the inside of the disc cleaner of FIG. 9, with a part of the lid being removed.

In FIGS. 9 through 11, the disc cleaner shown therein includes a main body casing 101 and a lid 102. On the upper surface of the body casing 101 is formed a recessed portion 104 having a circular cross section so that a digital audio disc 103 is positioned in the recessed portion 104, and at the same time, a mat 106 is laid for receiving the label surface of the disc 103 onto a mounting surface 105 which is the inner bottom surface of the recessed portion 104. The mat 106 is preferably made of a material having large frictional coefficient and flexibility, e.g., chamois leather or rubber, etc. from the viewpoint of prevention of slippage or flaws of the disc 103.

There is projecting a battery box 108 upwards in the back of the mounting plate 105. A rear end portion of the lid 102 which covers the mounting plate 105 is pivotally and rotatably supported by a shaft 109 at the opposite sides of the battery box 108.

A disc cleaner body 110 is disposed on the inner surface of the lid 102, which body 110 is revolved and rotated by a rotating member 111 provided with the body casing 101.

Figure 12:
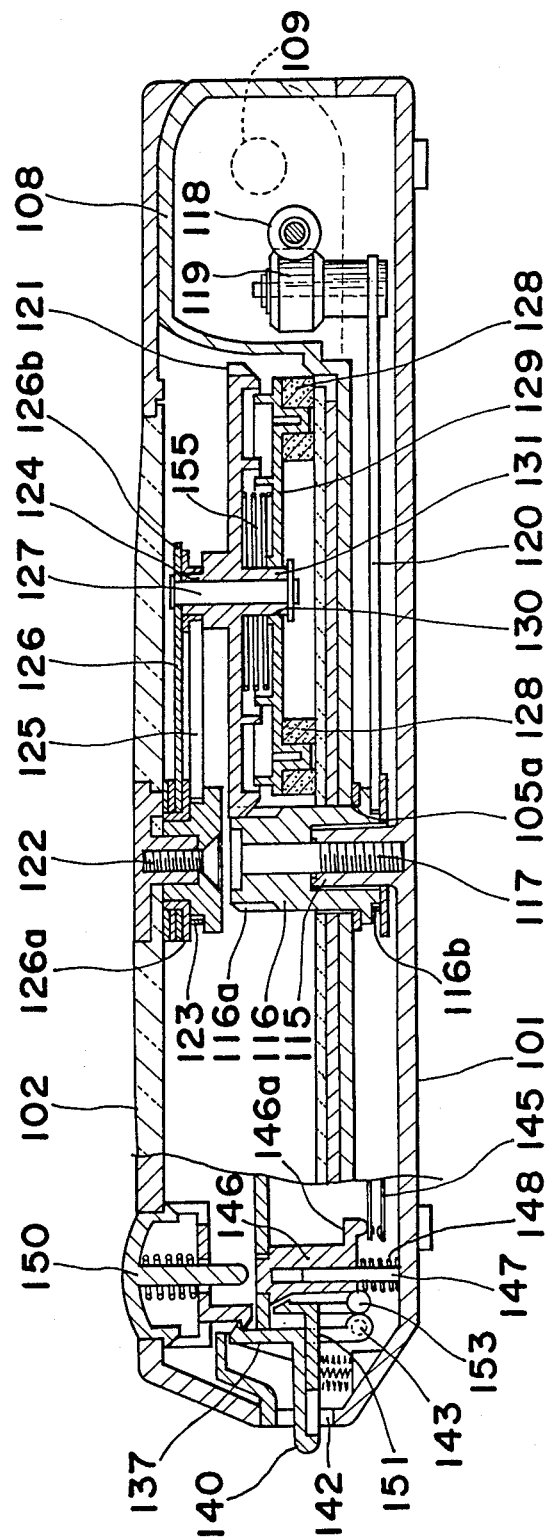
FIG. 12 is a cross sectional view taken along the line I—I of FIG. 11.

The rotating member 111 is comprised of a motor 112 provided at the side of the body casing 101 for driving the rotating means 111 and a battery 114 which is a power source for the motor 112 and accommodated within the battery box 108 in alignment with the motor 112. The mounting face 105 has an opening 105a formed at the center thereof. An output gear 116 is rotatably supported by a set screw 117 so as to be perpendicularly inserted through a boss 115 projecting onto the inner bottom surface of the casing below the opening 105a. Further, the output gear 116 has a gear tooth 116a formed in the outer periphery at the upper end thereof projecting upwards from the mounting face 105, with a tooth 116b in the outer periphery at the lower end below the mounting face 105. The output gear 116 is decelerated and rotated through a timing belt 120 suspended over between a worm gear 119 in mesh with a worm 118 on the shaft of the motor 112 and the lower tooth 116b. On the other hand, as shown in FIG. 12, there are provided an input gear 121 to be meshed with the tooth 116a, and a fixed gear 123 tightly secured by a screw 122 to the central portion on the inner surface of the lid 102. The input gear 121 is formed with a gear 124 which is projected from the central part on the upper surface of the gear 121. The gear 124 is connected with the fixed gear 123 through a timing belt 125. The input gear 121 is rotatably supported by a connecting pin 127 at an end portion 126b of a supporting plate 126, the other end 126a of which is rotatably inserted over the fixed gear 123.

The disc cleaner 110 is formed of a plurality of pads 128 made of fluffy urethane and sponge. All of the pads 128 are arranged at equal angles separated from each other on a concentric circle at the lower surface side of a disc-like pad holding base 129. The pad holding base 129 has a hole 130 formed at the center thereof. The hole 130 is inserted through a boss 131 projecting out of the central part of the lower surface of the input gear 121 in such a manner as to be hindered from rotating and to be vertically movable. At the same time, a spring 155 is disposed between the pad holding base 129 and the input gear 121, such that the disc cleaner body 110 is always held by the spring 155 in the condition that it is urged downwards to the lower surface side of the input gear 121.

The disc cleaner 110 is placed in such a position relative to the disc 103 on the mounting face 105 that when the lid 102 is closed, the cleaner body 110 is brought into pressed contact with the signal surface of the disc 103 within the radius area thereof at even strength.

In the meantime, the positional relationship between the input gear 121 and the output gear 116 is so set that when the lid 102 is closed, the output gear 116 is brought in mesh with an outer peripheral tooth of the input gear 121, and on the other hand, when the lid 102 is opened more than half to separate the disc cleaner body 110 from the disc 103, the input gear 121 is detached from the output gear 116.

There are also a lid urging means which urges the lid to be half-opened and a lid locking means which locks the lid in the closed state against the urging force of the lid urging means, both placed between the lid 102 and the body casing 101.

Referring to FIGS. 9 through 11, the abovedescribed lid urging means has holes 32 opened at opposite right and left sides of an upper wall 101a rearwards of the mounting face 105. A shaft 133 protruding from the inner bottom surface of the casing in the lower part inside each hole 132 is inserted through by a force pin 134 having a flange 134a, such that the force pin 134 can be moved in a vertical direction. The force pin 134 is urged upwards at all times to such a degree as to push the flange 134a in contact with the upper wall 101a, by a spring 135 provided between the flange 134a and the inner bottom surface of the casing. On the other hand, a push pin 136 is projected out of the inner surface side of the lid 102. When the lid 102 is completely closed as shown in FIG. 9, the push pin 136 enters the hole 132, thereby to press the force pin 134 downwards against the spring 135.

In the meantime, the lid locking means is comprised of a to-be-engaged element 137 formed at the side of the lid 102 and a locking lever 138 which is formed at the side of the body casing 101 and engageable with the element 137. The hooked element 137 having a claw 137a is projected downwards from the inner bottom surface of a recessed portion 139 at the front end portion on the upper surface of the lid 102. The locking lever 138 includes a claw 138a which is engageable with the claw 137a of the element 137 and, an operating part 140 which is integrally formed with the claw 138a. The claw 138a of the locking lever 138 is projected backwards from a notched portion 141 on the upper wall 101a at the front end of the body casing 101, and the operating part 140 is supported inside the body casing to be vertically and swingingly movable around a shaft 143, and is partly projected frontwards from a notched portion 142 in a front wall 101c of the body casing 101. At the same time, the locking lever 138 is always swingingly urged upwards by a spring 144 inserted between the operating part 140 and the inner bottom wall of the casing.

Thus, in the foregoing construction, when the lid 102 is closed, a tip end of the element 137 slides on a tapered portion 138b at the upper end of the claw 138a, such that the locking lever 138 is moved a little downwards around the shaft 143. Then, the claws 137a and 138a are engaged with each other to lock the lid in the closed state (referring to FIG. 12). Simultaneously with this, as shown in FIG. 9, the push pin 136 pushes down the force pin 134 in spite of the urging force of the spring 135, and accordingly the lid 102 in the closed state is forced open by the force pin 134.

Figure 13A:
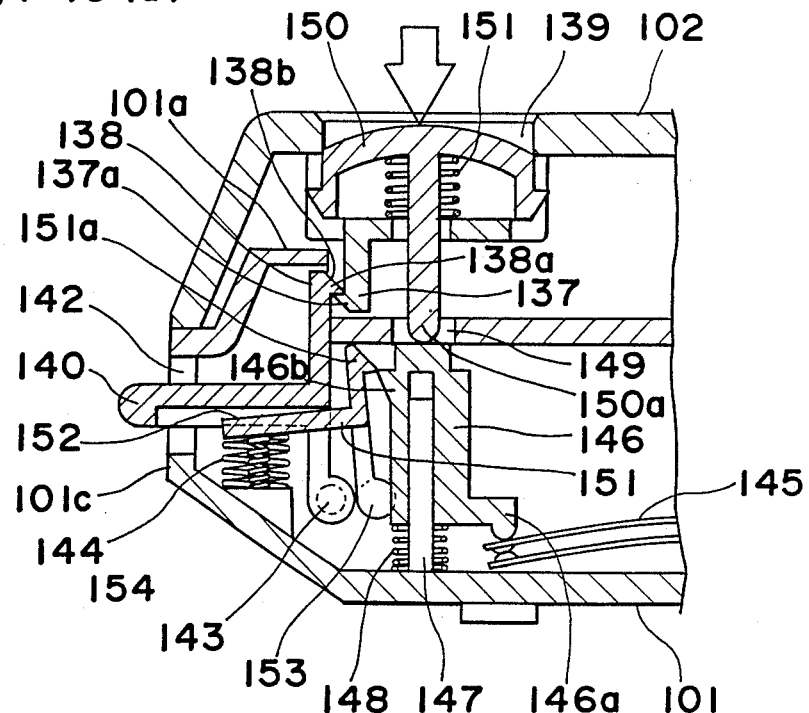
FIGS. 13(a) and 13(b) are views respectively explaining the operation of a switch operating mechanism and a lid locking means of the disc cleaner of FIG. 9.
Figure 13B:
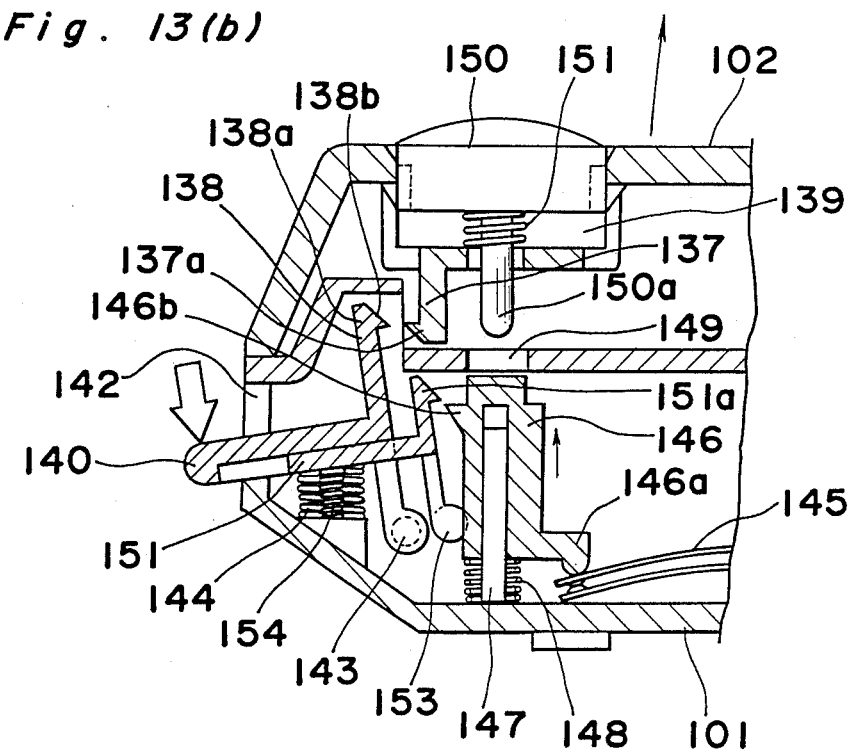
Figure 14:
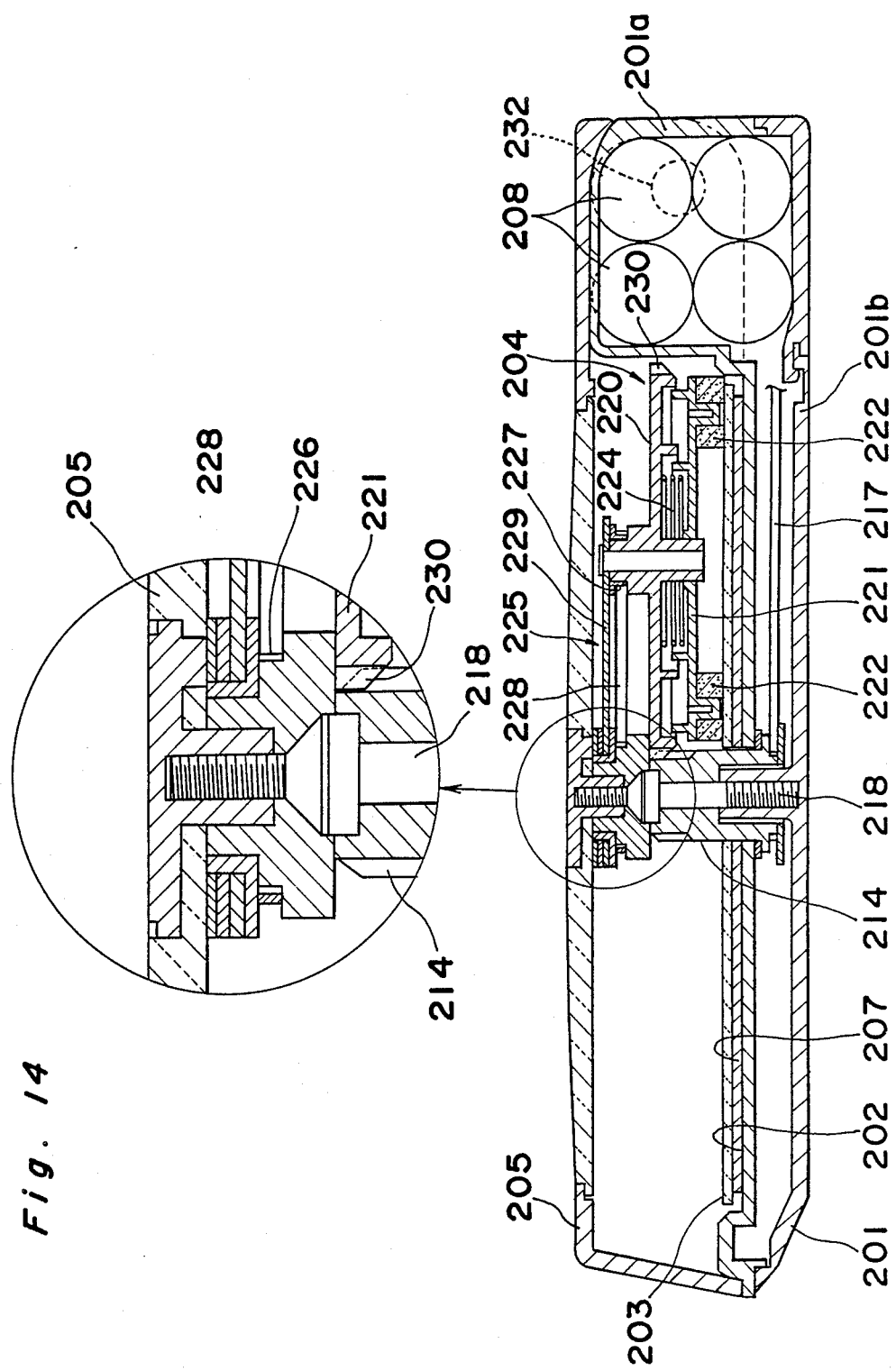
FIG. 14 is a vertical side elevational view of a disc cleaner according to a third embodiment of the present invention.
Figure 15:
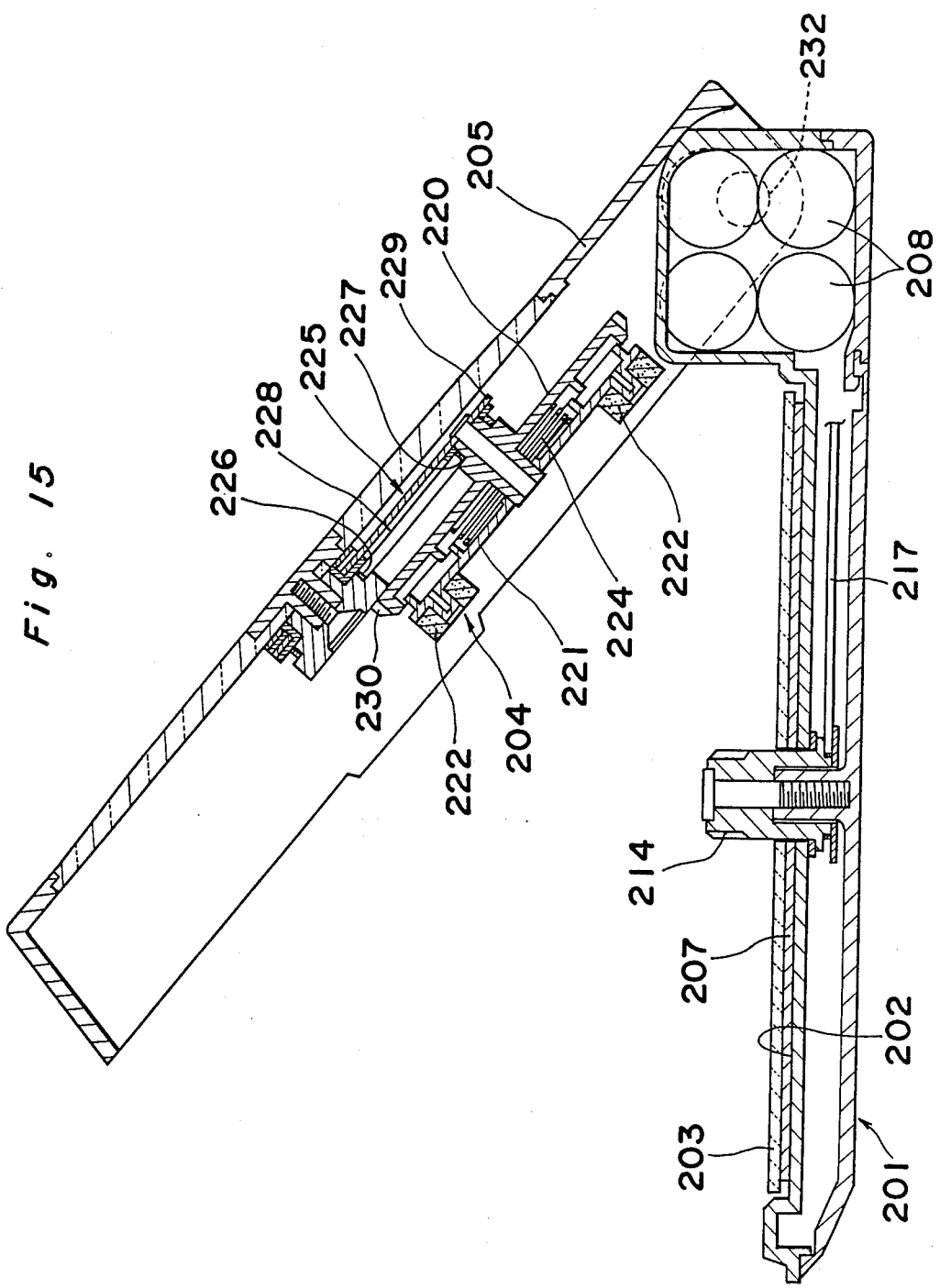
FIG. 15 is a vertical side elevational view of the disc cleaner of FIG. 14, with a lid being opened.

When it is desirable to open the lid 102, the operating part 140 of the locking lever 138 is manually forced down against the spring 144, and the locking lever 138 is moved around the shaft 143, as shown in FIG. 13(b), thereby releasing the engagement of the claw 138a from the claw 137a. Immediately thereafter, the force pin 134 pushes up the push pin 136 and the lid 102 is forced to be half-opened, as shown in FIG. 10. In other words, the opening angles of the lid 102, when the lid 102 is half-opened, are set to correspond to such angles that the pad 128 in contact with the signal surface of the disc 103 is separated a little from the signal surface.

The motor 112 for the rotating member 111 is turned on and off by a switch 145 accommodated in the body casing 101. Moreover, the switch 145 has a pin plunger 146 so supported by a shaft 147 projecting from the inner bottom wall of the casing as to be vertically movable. The pin plunger 146 is formed with a contact press 146a for pressing contacts of the switch 145. In a normal state shown in FIG. 12, the contact press 146a is urged upwards by a spring 148 so that the contacts are separated from each other. It is to be noted here that the upper end surface of the pin plunger 146 is exposed to a hole 149 in the upper wall 101a of the body casing 101. Meanwhile, an operating knob 150 for operating the switch 145 is provided within the recessed portion 139 in the lid 102 in such a manner that it is always urged by a spring 151 in a direction outwardly protruding from the lid 102. The operating knob 150 has its end 150a made flat with the upper end surface of the pin plunger 146 only when the lid 102 is completely closed. As shown in FIG. 13(a), when the lid 102 is closed and the operating knob 150 is pushed down, the pin plunger 146 is pressed down to turn on the switch 145.

The operation for turning off the switch 145 can be delayed in association with the operation for releasing the engagement of the claws 137a and 138a by the locking lever 138. More specifically, a plunger locking lever 151 is disposed between the lid locking lever 138 and the pin plunger 146, and provided with an operating part 152 below the operating part 140 of the locking lever 138 and a claw 151a vertically and swingingly supported around a shaft 153 parallel to the shaft 143 so as to be opposed to the claw 146b. The operating part 152 of this plunger locking lever 151 is also always urged by a spring 154 in an upward swinging direction. Thus, as shown in FIG. 13(a), by pressing down the operating knob 150 after closing the lid 102, the pin plunger 146 is pushed down when the claw 146b of the pin plunger 146 is pressed in contact with the claw 151a of the plunger locking lever 151, which is in turn moved a little around the shaft 153. Then, as shown in FIG. 9, the claws 146b and 151a are engaged with each other, thereby keeping the pin plunger 146 from falling down and to hold the switch 145 in an ON state. Thereafter, as shown in FIG. 13(b), when the operating part 140 of the lid locking lever 138 is pushed down by hand, the claw 138a of the locking lever 138 is first disengaged from the claw 137a of the element 137. The lid 102 is then opened approximately half by the force pin 134. In consequence to this, the pad 128 of the cleaner body 110 gradually reduces the pressure added onto the signal surface of the disc 103 by its own elasticity and the elasticity of the spring 155. While the pad 128 reduces the pressure and rotates, it is separated from the signal surface of the disc 103. Thereafter, if the operating part 140 is further pushed downwards, the operating part 152 of the plunger locking lever 151 receives the pressure of the operating part 140 to be moved around the shaft 153. Accordingly, the claw 151a is released from the claw 146a of the pin plunger 146 which is then pushed up by the spring 148, removing the pressure against the switch 145. As a result, the switch 145 is turned off to stop the rotation of the motor 112, and the cleaner body 110 is stopped rotating.

The cleaning operation will be described hereinbelow. After the disc 103 is placed horizontally on the mat 106 of the mounting saucer 105, with the lid 102 being opened, and the liquid cleanser is sprayed onto the signal surface of the disc, the lid 102 is completely closed to be automatically locked by the lid locking means. Then, the input gear 121 at the side of the lid 102 is brought into the condition to be engaged with the output gear 116. At this time, by pressing the operating knob 150 manually to push down the pin plunger 146, and turning on the switch 145, the motor 112 starts rotating. The switch 145 remains in the ON state if the pin plunger 146 is engaged with the plunger locking lever 151 to be kept from falling as is described earlier. The rotation of the motor 112 brings about the rotation of the output gear 116. The disc cleaner body 110 rotates around the center of the input gear 121, and at the same time, it revolves around the center of the fixed gear 123 through rotation and revolution of the cleaner body 110. The dirt on the signal surface of the disc 103 is cleaned off. After the cleaning, when the operating part 140 of the lid locking lever 138 is manually pushed down, the lid 102 is opened approximately half by the force pin 134 as soon as the engagement of the claw 138a with the claw 137a is released. And, the cleaner body 110, that is, the pad 128 is, while rotating, detached from the signal surface of the disc 103. At this time when the pad 128 is separated from the disc 103, the pressure onto the signal surface of the disc 103 from the pad 128 is gradually reduced, and therefore the liquid cleanser is dispersed on the signal surface equally without leaving any local traces of the pad 128. Subsequently, if the operating part 140 is further pushed down, the pin plunger 146 is disengaged from the plunger locking lever 151 to be pressed upwards by the spring 148. The switch 145 is turned off and the motor 112 is stopped. Thus, the rotation of the cleaner body 110 is stopped.

The switch 145 is rendered unable to be turned off immediately before the lid 102 is half opened, preferably immediately before the output gear 116 is disengaged from the input gear 121. By this arrangement, the output gear 116 can be stopped rotating before the input gear 121 is disengaged from the output gear 116, thereby erasing the knocking sound between the two gears 116 and 121.

In the disc cleaner of the second embodiment as described above, the lid locking lever 138 and the plunger locking lever 151 are overlapped with each other, so that the switch 145 can be turned off in a delayed manner in association with the release of the locking of the lid. In place of this, however, the lid locking lever 138 and the plunger locking lever 151 may be separately provided so as to be operated independently from each other. In this case, it should be so arranged that so long as the lid locking lever 138 is not released to open the lid half, the switch 145 cannot be turned off by the operation of the plunger locking lever 151. By way of example, such arrangement may be possible that the plunger locking lever 151 which is covered with the lid 102 cannot be operated until the lid 102 is half opened.

As is clear from the above-described second embodiment of the present invention, since the switch 145 which controls the rotating member 111 of the cleaner body 110 is adapted not to be operable before or immediately before the lid 102 is opened to such a degree that the disc cleaner body 110 is separated from the disc 103, it is possible that the cleaner body 110 is separated from the disc 103 while it is rotating without being stopped rotating, in the course that the lid 102 starts to be opened. Therefore, it is advantageous if the dirt or dust once wiped off from the disc 103 does not remain on the disc 103, thereby improving the cleaning efficiency.

Third Embodiment

FIGS. 14 through 20 illustrate a third embodiment of the present invention as applied to a disc cleaner for a digital audio disc.

Referring to FIGS. 14 through 17, a disc cleaner shown therein is so arranged that a disc 203 placed on a disc mounting face 202 on the upper surface of a main body 201 is wiped off at the top surface thereof by a cleaner body 204 while the disc remains stationary. The cleaner body 204 is supported at the inner surface of a covering 205 which covers over the upper surface of the main body 201. The cleaner body 204 is rotated by a driving mechanism 206 provided with the main body 201 only when the covering 205 is closed.

The main body 201 consists of an upper casing 201a and a lower casing 201b. The upper casing 201a has a disc mounting face 202 recessed in the upper surface thereof. A rubber mat 207 having a diameter smaller than the disc 203 is laid on the surface of the mounting face 202. In the depth of the main body 201, there is divided a chamber 210 projecting upwards from the mounting face 202, which accommodates a battery 208 and a motor 209 therein.

The driving mechanism 206 is provided between the motor 209 and a driving gear 214 projecting upwards from the center of the mounting face 202. The power of the motor 209 is, through a worm 215, a worm gear 216 and a timing belt 217 in this order, transmitted to the driving gear 214. The driving gear 214 is travellingly supported to a boss in the inner surface of the lower casing 201b through a pin 218.

The cleaner body 204 is comprised of a disc-like pad base 220, a circular holder 221 supported to the lower surface of the pad base 220 so as to be vertically movable, and four cleaning pads 222 arranged in a circular shape in the lower surface of the holder 221. A spring 224 is intervened between the holder 221 and the pad base 220 so as to urge the holder 221 downwards at all times. The cleaning pad 222 is detachably secured to the holder 221 for exchange with a new one.

In order that each of the cleaning pads 222 is slidable in contact with the disc 203 generally in the diametrical direction of the disc, an attitude controlling mechanism 225 is provided between the pad base 220 and the covering 205. Particularly, for rendering small the rotational cycle of the cleaner body 204, the attitude controlling mechanism 225 is comprised of a sun gear 226 secured to the inner surface of the covering 205, a planet gear 227 protrudingly formed at the center of the top surface of the pad base 220, a timing belt 228 wound around the gears 226 and 227, and a supporting arm 229 for restricting the trace of the cleaner body 204 and which supports the entire cleaner body 204 to be rotatable around the sun gear 226, i.e., the center O of the revolution. The revolutional center O is found on the central line of the disc 203 when the covering 205 is closed. The attitude controlling mechanism 225 is driven by the driving gear 214 of the driving mechanism 206. For this purpose, an input gear 230 is formed in the peripheral surface of the pad base 220, so that the input gear 230 is brought in mesh with the driving gear 214 when the covering 205 is closed. The gear ratio of the driving gear 214 and the input gear 230 is set to be 1:10. Moreover, the gear ratio of the planet gear 227 and the sun gear 226 is set to be 1:2.4.

Figure 16:
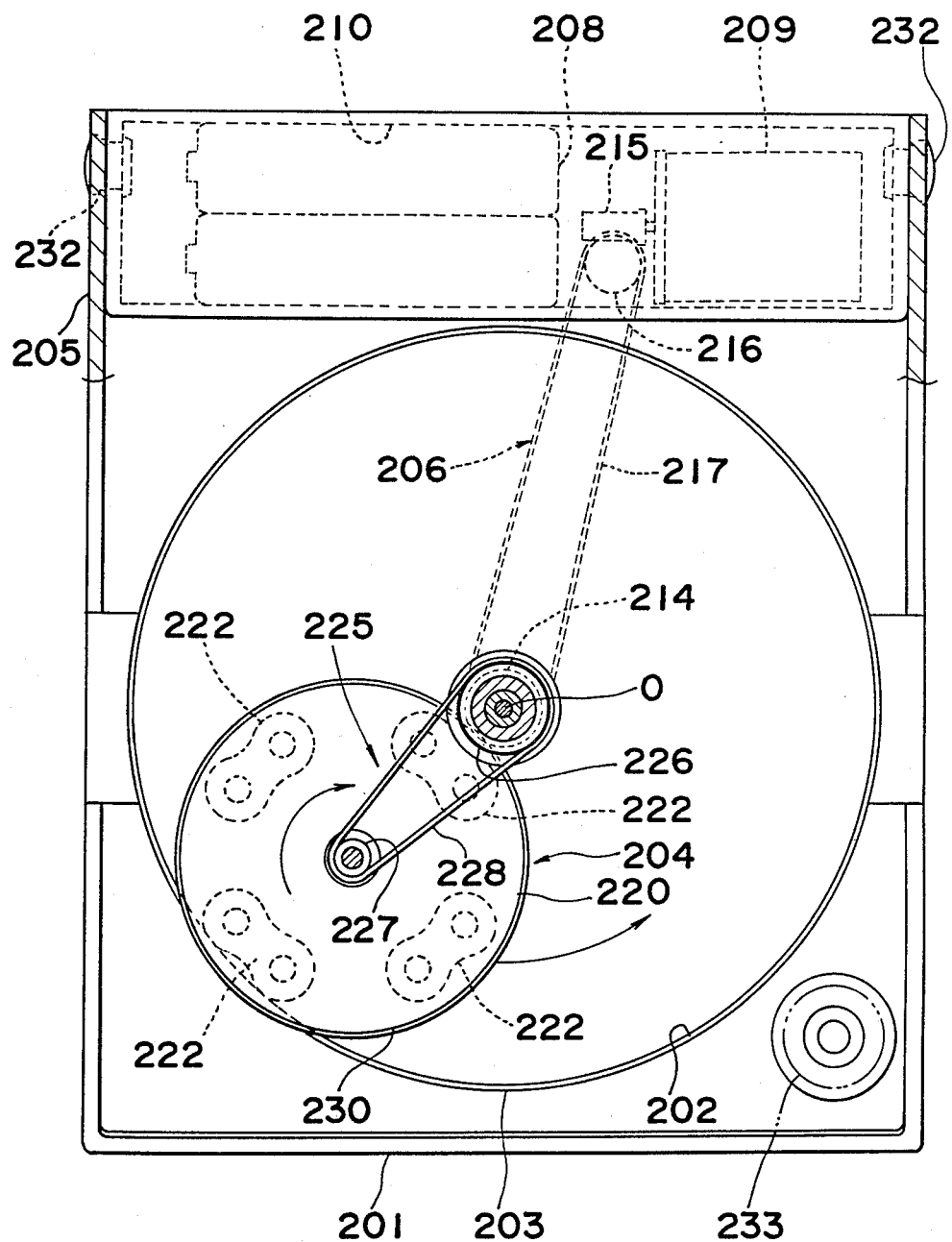
FIG. 16 is a plane view showing the inside of the disc cleaner of FIG. 14.
Figure 17:
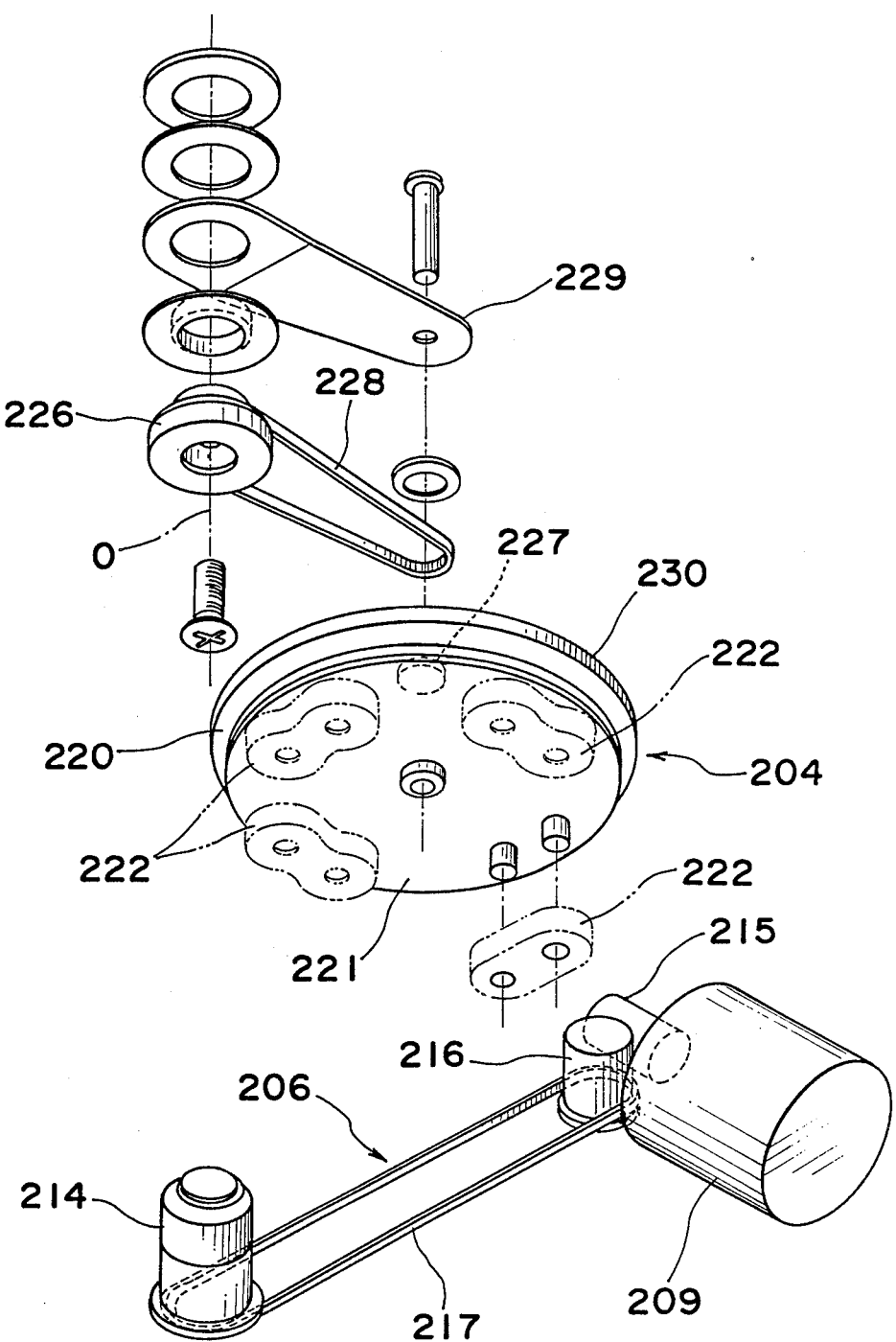
FIG. 17 is an exploded perspective view of a driving unit of a cleaner body of the disc cleaner of FIG. 14.
Figure 18:
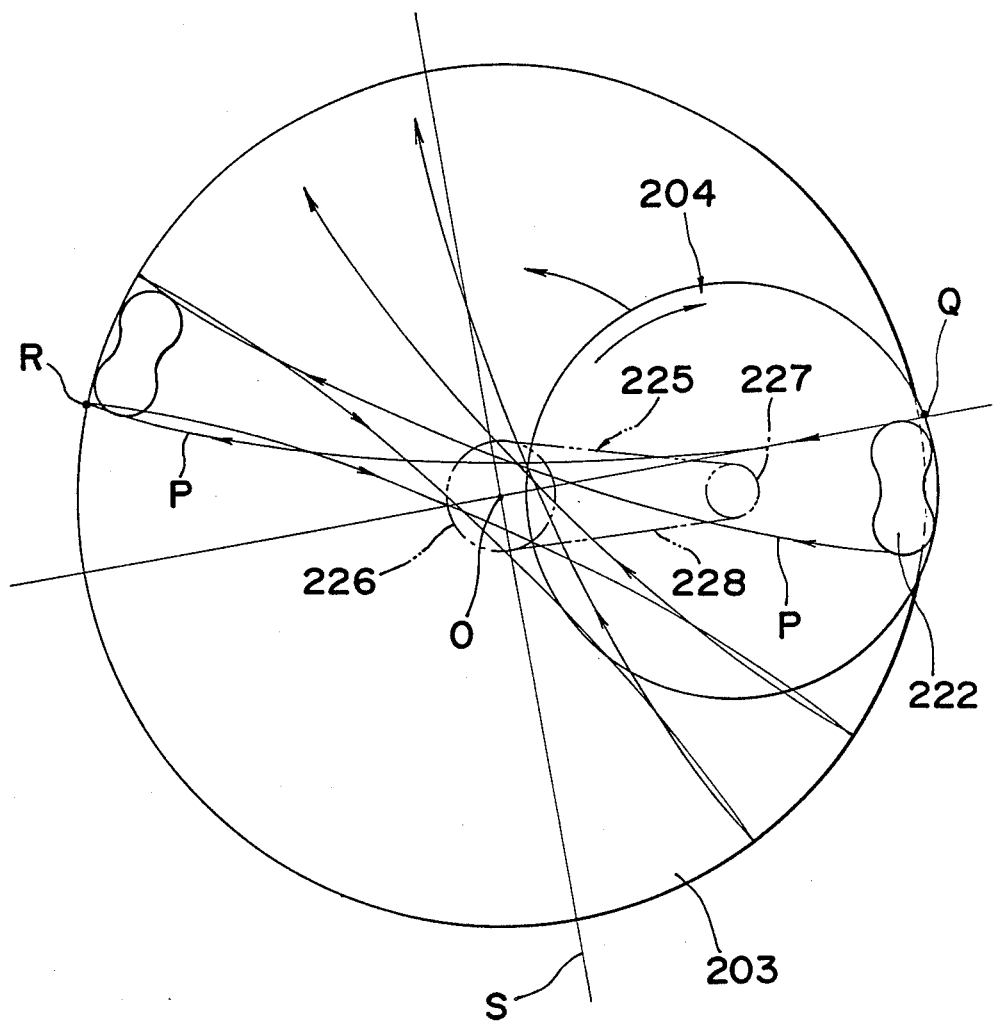
FIG. 18 is a plane view showing the trace of a moving cleaning pad of the disc cleaner of FIG. 14.

Referring to FIG. 16, when the driving gear 214 is driven in the counterclockwise direction, the cleaner body 204 rotates in the clockwise direction. At the same time, the planet gear 227 integral with the pad base 220 is also rotated in the clockwise direction. Therefore, the timing belt 228 is rotated relative to the planet gear 227, resulting in the counterclockwise movement of the cleaner body 204. In other words, the rotational direction of the cleaner body 204 is reverse to the revolutional direction thereof.

In FIG. 16, a switching knob 233 for starting the motor 209 is provided with the covering 205, which can turn on a switch inside the main body 201 only when the covering 205 is closed. A reference numeral 232 represents a central axis of rocking of the covering 205.

In the disc cleaner having the attitude controlling mechanism 225 in the above-described construction, the cleaner body 204 revolves while it rotates around the revolutional center O. Moreover, owing to the fact that the gear ratio between the sun gear 226 and the planet gear 227 is set to be 2.4:1, the cleaner body 204 makes 2.4 rotations while it revolves once. The cleaner body 204 wipes off the dirt from the surface of the disc 203, while drawing a continuous pattern P shown in FIG. 18. The cleaner body 204 makes 2.4 revolutions every one rotation. The trace P at this time is, supposing that one point in the peripheral edge of the disc 203 is regarded as a starting point Q, such that a terminal R is a point approximately opposite to the starting point Q in the peripheral edge of the disc 203. The trace P follows the diametrical direction of the disc 203 in all parts thereof. Accordingly, lack of signals resulting from an erroneous poor cleaning can be remarkably prevented.

If the gear ratio between the sun gear 226 and the planet gear 227 is set to be a decimal value, the traces P draw a little different pattern from each other every rotational cycle. Because of this difference of the trace P, a portion on the disc 203, which has not be cleaned before, can be wiped off one by one, and accordingly, the whole surface of the disc 203 can be perfectly cleaned.

Each cleaning pad 222 takes the same posture with respect to the revolutional center O every rotational cycle thereof. For example, the cleaning pad 222 in the peripheral edge on the disc 203 approaches the revolutional center O and then returns onto the peripheral edge. At this time, since the starting point Q of the trace P is nearly opposed to the terminal R, the cleaning pad 222 takes a posture reversed with respect to the revolutional center O. Namely, the cleaning pad 222 changes its posture after the cleaning pad 222 is nearest to the revolutional center O, such that the peripheral side edge which cleans the disc 203 is shifted. Therefore, the peripheral side edge of the cleaning pad 222 is not damaged or partially worn away. In addition, near the center of the disc 203 where no information is recorded, the cleaning pad 222 takes the narrowest posture in the moving direction thereof, and accordingly, useless cleaning can be prevented.

Although it is so arranged in the third embodiment of the present invention, as described above, that the gear ratio between the sun gear 226 and the planet gear 227 is set to be a decimal value, and the trace P draws a continuous polygonal pattern, it may not be always required. For example, as shown in FIGS. 19(a) through 19(d), it may be so designed that the trace P describes a closed loop every revolutional cycle. In this case, however, it is preferable that the cleaning member 204 is formed into a ring shape in order to prevent the disc 203 from remaining partially uncleaned.

The sun gear 226 may be arranged to be movable in association with the planet gear 227 through a chain.

Figure 20A:
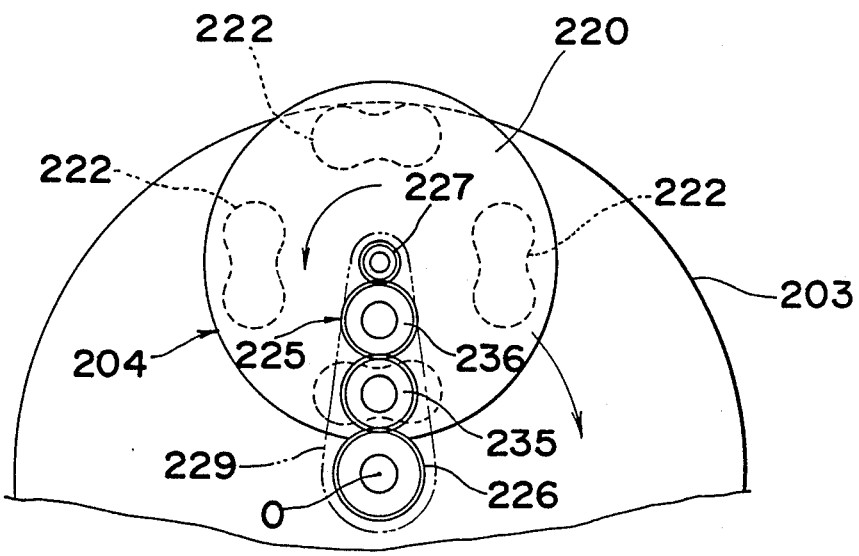
FIGS. 20(a) and 20(b) are plane views generally showing an attitude controlling mechanism according to respective modified embodiments of the present invention.
Figure 20B:
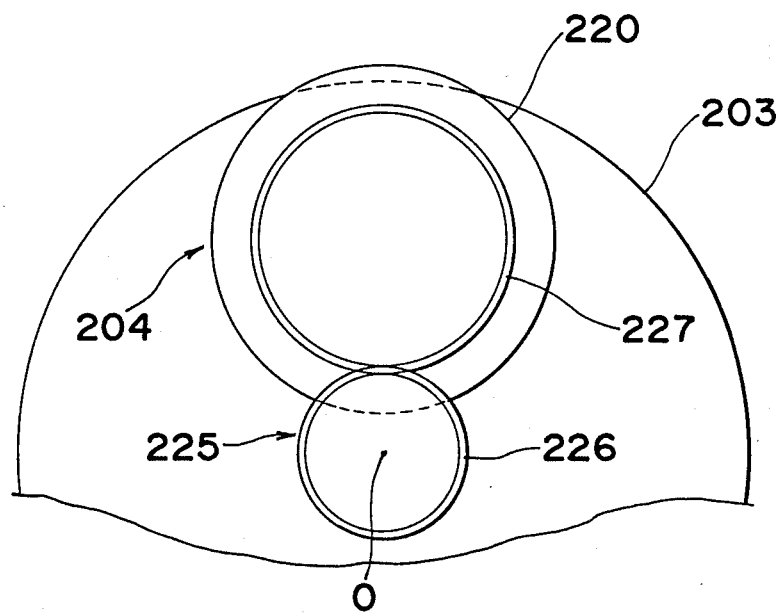

Further, the cleaning member 204 can be driven through engagement of the gears 226 and 227 as shown in FIGS. 20(a) and 20(b). In FIG. 20(a), there are two intermediate gears 235 and 236 between the sun gear 226 and the planet gear 227. On the other hand, in FIG. 20(b), the planet gear 227 is a large gear and directly meshed with the sun gear 226. The attitude controlling mechanism 225 can be variably changed as described above, but the point is that the mechanism should make it possible to obtain such rotational cycle of the cleaner body 204 that the terminal R is on a limit line S which is a diametrical line orthogonal to the diametrical line of the disc 203 passing through the starting point Q of the trace P, or on the peripheral edge of the disc 203 opposite to the starting point Q, with the limit line S between the starting point Q and the terminal R. In the case where the terminal R is at the same side as the starting point Q with respect to the limit line S, the trace P includes many components following the peripheral direction of the disc 203.

Figure 19A:
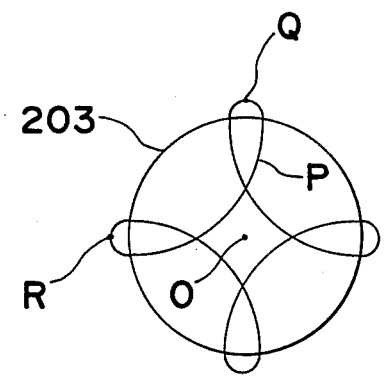
FIGS. 19(a) through 19(d) are plane views respectively showing the trace of a cleaning pad according to a modification of the third embodiment.
Figure 19B:
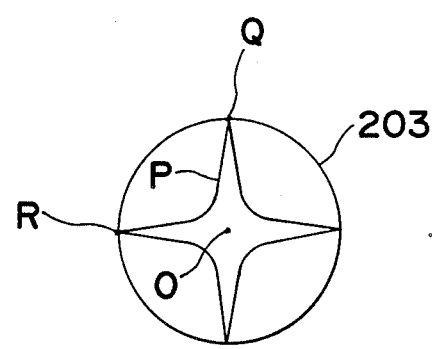
Figure 19C:
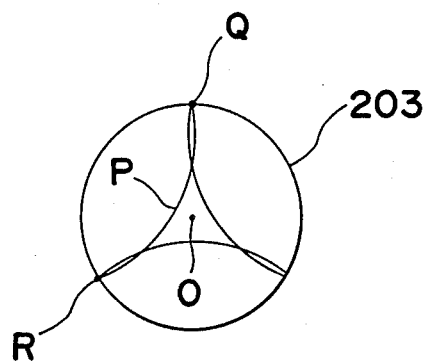
Figure 19D:
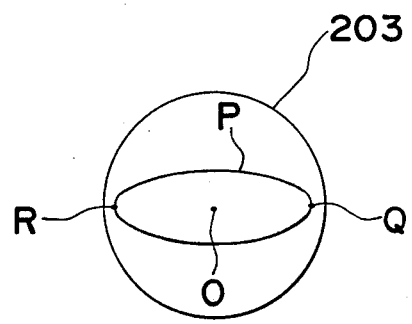

It is to be noted here that the attitude controlling mechanism 225 is preferably included within the area of the outline of the disc 203 as in a plane view, but, such a trace P as shown in FIG. 19(a) may be possible in some cases in which a part of the cleaning pad 222 protrudes out of the outline of the disc 203. It is advantageous in this case that cotton dust or the like adhering to the cleaning pad 222 is removed from the surface of the disc 203, or squeezed at the peripheral edge of the disc 203, and thus the cleaning pad 222 is kept clean.

The operation of the attitude controlling mechanism 225 may be manually conducted, and moreover, the attitude controlling mechanism 225 and the cleaner body 204 may be placed at the side of the main body 201.

As has been described above, in the disc cleaner according to the third embodiment of the present invention, the attitude controlling mechanism 225 is so constructed that the rotational cycle of the cleaner body 204 can be made sufficiently small per one revolutional cycle thereof, and also it is so arranged that the trace shown by the cleaning pad 222 every rotational cycle has, for example, the starting point Q in the peripheral edge of the disc 203, and the terminal R opposite to the starting point Q in the peripheral edge of the disc 203. Accordingly, almost all portions of the trace P follow the diametrical direction of the disc 203. Therefore, even when the surface of the disc 203 is scratched or flawed during the cleaning, an erroneous reading of the signals or the generation of noises resulting from the above-described scratches or flaws on this disc can be solved, with lack of signals securely prevented.

Furthermore, in obtaining the above trace P, the attitude controlling mechanism 225 has such construction that makes the cleaner body 204 revolve as it rotates around the revolutional center O on the central line of the disc 203, which therefore prevents the attitude controlling mechanism 225 from greatly protruding out of the outline of the disc 203, resulting in realization of miniaturization of the disc cleaner.

Fourth Embodiment

One example of a disc cleaner according to a fourth embodiment of the present invention will be described with reference to FIGS. 21 through 30.

Figure 21:
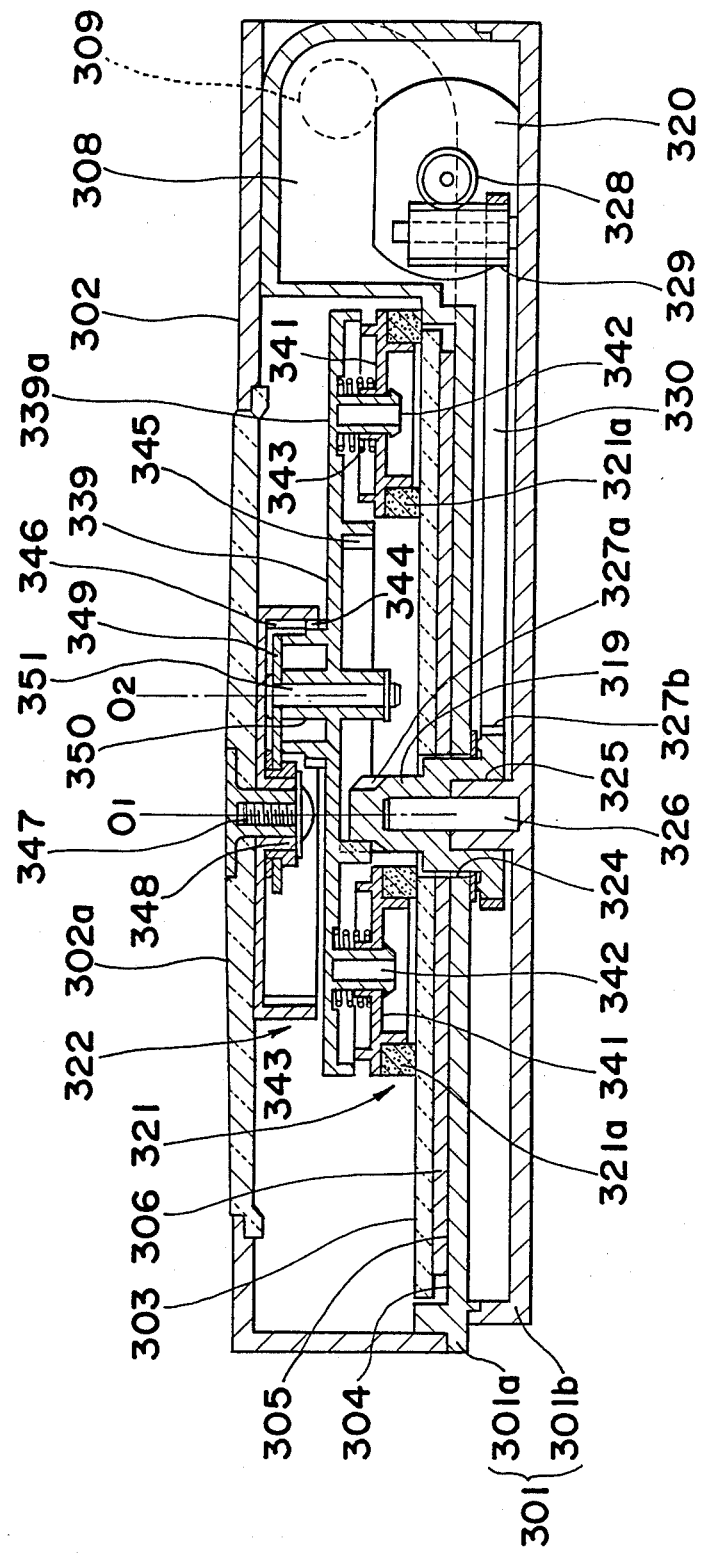
FIG. 21 is a vertical cross sectional view of a disc cleaner according to a fourth embodiment of the present invention, with the lid being closed.
Figure 22:
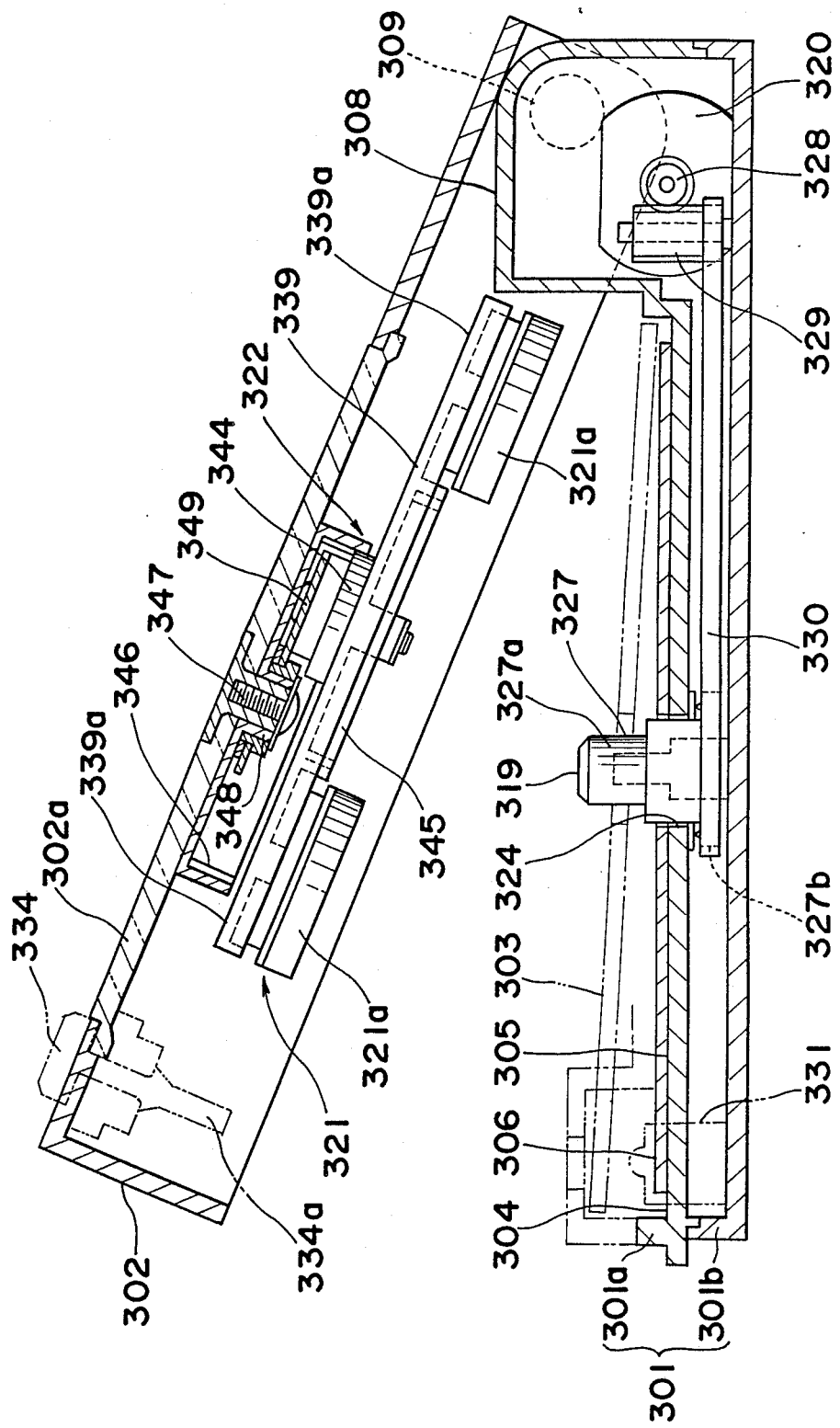
FIG. 22 is a vertical cross sectional view of the disc cleaner of FIG. 21, with the lid being opened.
Figure 23:
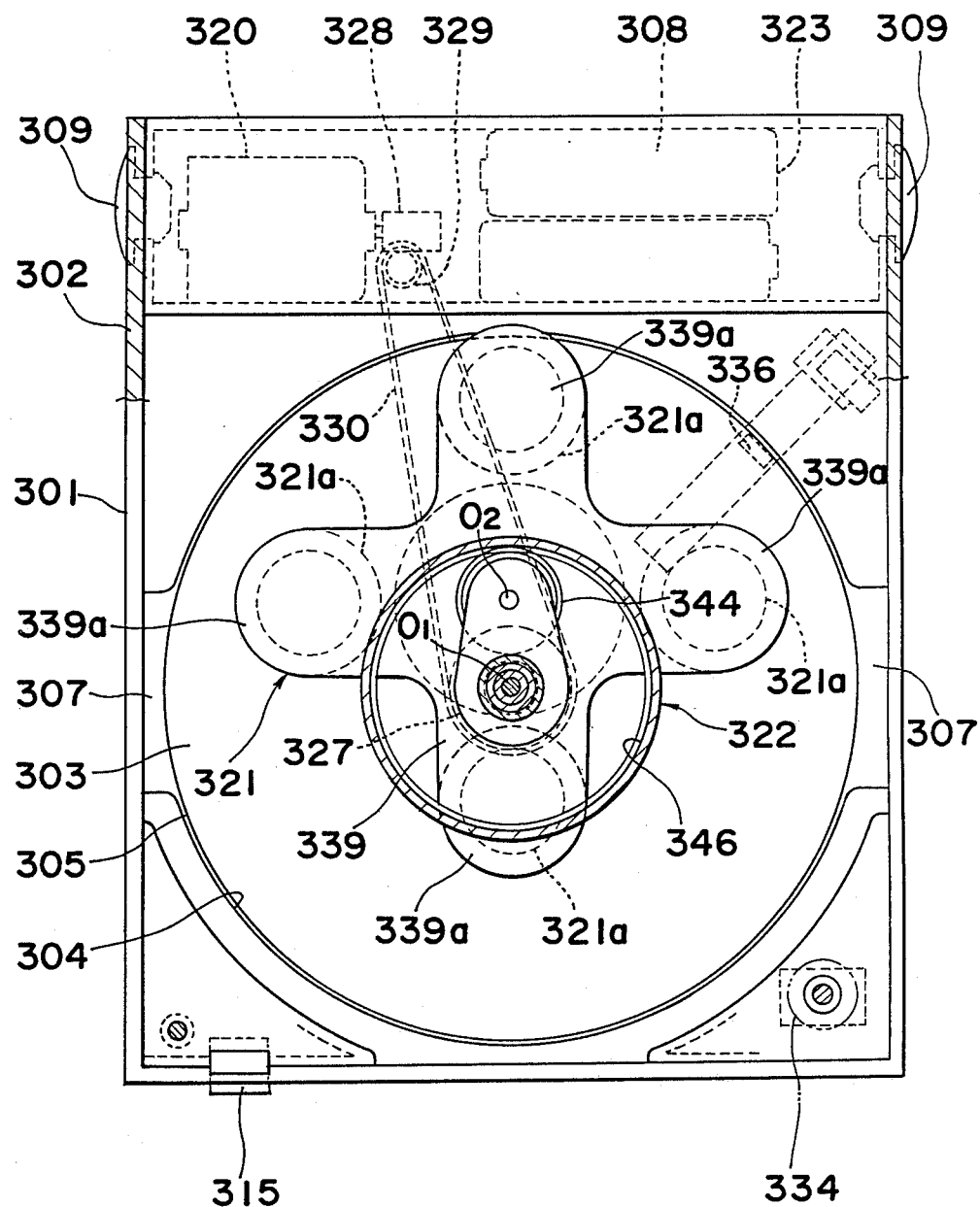
FIG. 23 is a plane view showing the inside of the disc cleaner of FIG. 21, with the lid being removed.
Figure 24:
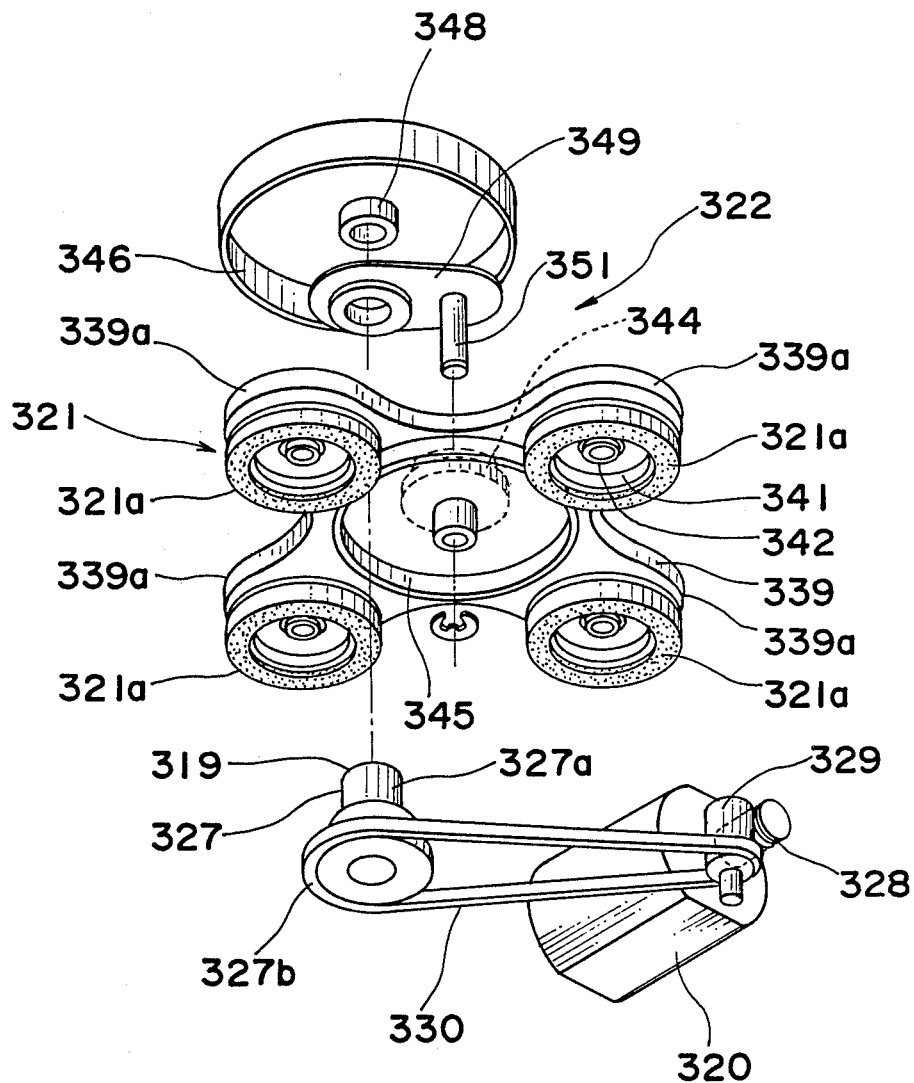
FIG. 24 is an exploded perspective view of a driving unit of a cleaner body of the disc cleaner of FIG. 21.

The disc cleaner of the fourth embodiment shown in FIGS. 21 and 22 has a main body casing 301 and a lid 302. The main body casing 301 is formed with an upper casing 301a and a lower casing 301b which are thrust together. The main body casing 301 has a circular recessed portion 304 formed on the top surface of the upper casing 301a so that a disc 303, that is, a digital audio disc 303 is positioned in the recess 304. In addition, the inner bottom surface of the recess 304 is utilized as a mounting face 305 on which is laid a mat 306 for receiving the label surface of the disc 303. The mat 306 is preferably made of, for example, chamois leather or rubber, etc. which has large frictional coefficient and flexibility, in view of preventing the disc 303 from slipping or being flawed. As shown in FIG. 23, there is formed on the top surface of the main body casing 301 a recessed groove 307 which communicates to the opposite sides of the above-described recess 304. Therefore, the disc 303 within the recess 304 is able to be easily taken off by a finger through the recessed groove 307.

A battery box 308 is formed in the back of the recess 304 on the top surface of the main body casing 301 in a manner to project upwards. A rear end portion of the lid 302 which opens or closes the top surface of the main body casing 301 is totally and pivotally connected by a shaft 309 to the opposite sides of the battery box 308.

Figure 25:
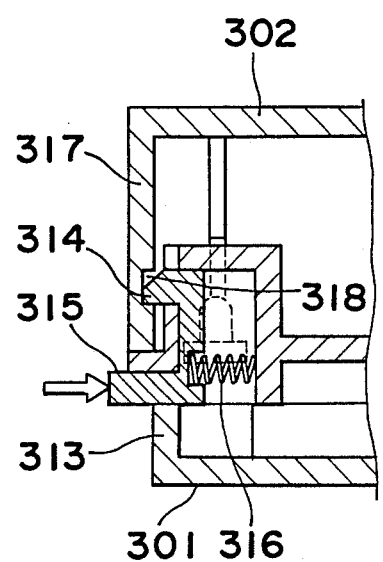
FIG. 25 is a cross sectional view showing a portion of a lid locking mechanism of the disc cleaner of FIG. 21.
Figure 26:
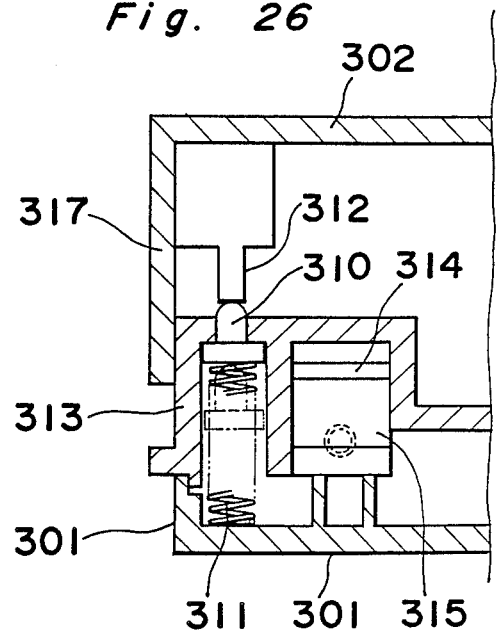
FIG. 26 is a cross sectional view showing a portion of a lid urging mechanism of the disc cleaner of FIG. 21.

Referring to FIGS. 25 and 26, there is aligned a lid locking means between the lid 302 and the main body casing 301. The urging means always urges an eject pin 310 by a spring 311 to protrude from a part of the front end on the top surface of the main body casing 301, while urging a push pin 312 to protrude at the inner surface side of the lid 302, such that the eject pin 310 is pushed down by the push pin 312 against the spring 311 when the lid 302 is completely closed. The lid locking means is provided with a locking element 315 having a claw 314 on a part of the front wall 313 of the main body casing 301. The claw 314 of the locking element 315 is adapted to be freely withdrawn in and out of the front wall 313 through a spring 316. On the other hand, a recessed portion 318 is formed in the inner surface of a front wall 317 of the lid 302 opposite to the front wall 313. Accordingly, when the lid 302 is completely closed, the claw 314 of the locking element 315 is engaged with the recessed portion 318. Thereafter, when the locking element 315 is pushed in a direction shown by an arrow in FIG. 25, the claw 314 comes off from the recessed portion 318, and at the same time, the eject pin 310 pushes up the push pin 312 to open the lid 302 a little upwards.

The main body casing 301 accommodates an output terminal 319 and a driving source 320. On the other hand, a cleaner body 321 and a cleaner body rotating mechanism 322 for rotating and revolving the cleaner body 321 upon receipt of the rotation from the output terminal 319 are installed at the side of the lid 302.

As shown in FIGS. 21 and 22, the driving source 320 which is a motor and a battery 323 which is a power source for the motor 320 are accommodated within the battery box 308 in alignment with each other at the side of the main body casing 301. The main body casing 301 has an opening 324 formed in the center of the mounting face 305, a driving shaft 326 rotatably and vertically inserted through and supported by a boss 325 on the inner bottom surface of the main body casing below the opening 324, and a driving gear 327 fixed to the upper end of the driving shaft 326. The driving gear 327 has a tooth 327a of a small diameter in the outer periphery at the upper end thereof, and a tooth 327b of a larger diameter than the tooth 327a in the outer periphery at the lower end thereof. The tooth 327a which becomes the output terminal 319 protrudes from the opening 324 about the mat 306. The driving gear 327 is decelerated and rotated through transmission by a timing belt 330 suspended between a worm gear 329 in mesh with a worm 328 on a shaft of the motor 320 and the tooth 327b.

Figure 28:
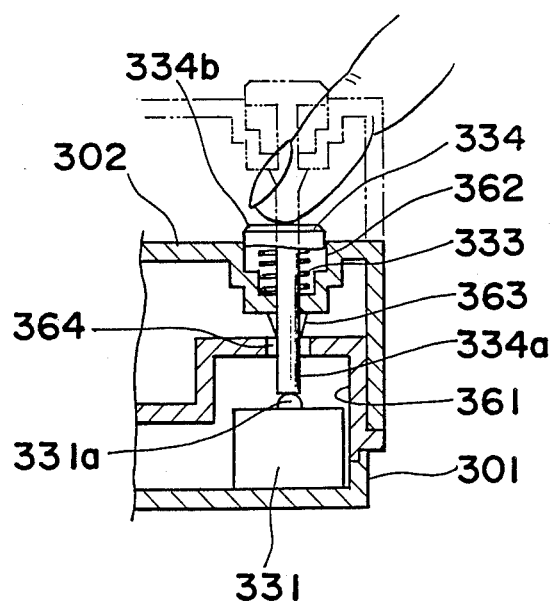
FIG. 28 is a cross sectional view of a portion of a switch operating mechanism in the disc cleaner of FIG. 21.
Figure 29:
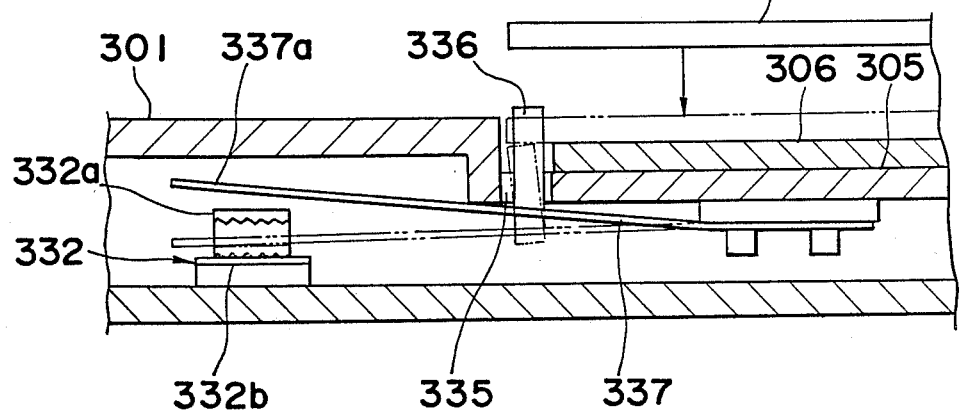
FIG. 29 is a cross sectional view of a portion of a detecting mechanism in the disc cleaner of FIG. 21.
Figure 30:
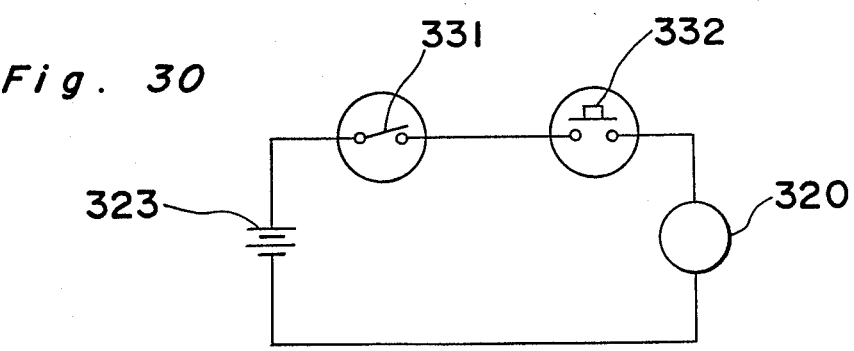
FIG. 30 is a circuit diagram of the disc cleaner of FIG. 21.

The motor 320 is controlled, as seen from a circuit diagram of FIG. 30, by a switch 331 and a detection switch 332 put in series in a motor driving circuit. The switch 331, which turns the driving source on or off, is accommodated in the main body casing 301 as shown in FIG. 28, and is turned on when pressed by an operating knob 334 which is always urged to project outside the lid 302 by a spring 333. The operating knob 324 and the switch 331 are so arranged that only when the lid 302 is completely closed, an end 334a of the operating knob 334 comes to coincide with the position of the switch 331, and after the lid 302 is closed and the operating knob 334 is pressed, the switch 331 is first turned on. As illustrated in FIG. 29, a detection pin 336 is always urged by a cantilever leaf spring 337 to protrude from the opening 335 formed at a part of the mounting face 305. When the disc 303 is placed horizontally onto the mat 306 on the mounting face 305, the detection pin 336 is pushed down for the first time by the weight of the disc 303, and concurrently, a free end portion 337a of the spring 337 is deformed. In accordance with this deformation of the spring 337, a movable contact 332a of the switch 332 is brought into contact with a fixed contact 332b.

The switch 331 is provided at the inner bottom of a corner 361 of the main body 301 so as to not be operable directly from outside. For switching the switch 331, an operating member 334 is formed by an operating pin 334a and an operating button 334b projecting at the upper end of the operating pin 334a, into the shape of a rivet. The operating member 334 is assembled into the lid 302 in such a condition that the operating button 334b is fitted into a button hole 362 engraved in the upper wall of the lid 302, so that the operating member 334 is freely withdrawn in or out of the lid 302. Although the operating member 334 is urged outwardly from the button hole 362 by the coil spring 333, a piece 363 which projects in the middle portion of the operating pin 334a is pressed in contact with the bottom wall of the button hole 362 for preventing the operating member 334 from coming off the hole 362. The ceiling wall of the division 361 is formed with an opened operating hole 364 so that the operating pin 334a comes adjacent to an operating element 331a of the switch 331 when the lid 302 is closed. When the operating member 334 is pushed in under the above-described condition, the switch 331 is turned into the ON (or OFF) state.

As is described hereinabove, if it is so arranged as to obtain such a state in that the switch 331 becomes able to be operated when the lid is closed, with the switch 331 provided inside the main body 301 and the operating member 334 provided at the side of the lid 302, only the single switch 331 can carry out the confirmation that the lid 302 is closed, and also the driving of the motor 320 thereafter. Therefore, not only can the switch 331 be prevented from being erroneously turned on, but also the closing of the lid 302 can be confirmed without any special switch therefor.

Moreover, since the lid 302 is locked in the closed state by the locking knob 315, unexpected movement of the lid 302 when the switch 331 is switched can be prevented, assuring a correct switching operation.

Furthermore, both the switch 331 and the operating member 334 are disposed at the front end of locking of the lid 302, and accordingly, unless the lid is perfectly closed, the operating member 334 is not able to be operated. For example, in comparison with the case where the switch 331 and the operating member 334 are both provided at the original side of locking, it can be more securely confirmed that the lid 302 is closed. It is to be noted that the switch 331 may be arranged in other structures such as in sliding structure and in turn-over structure.

Figure 34:
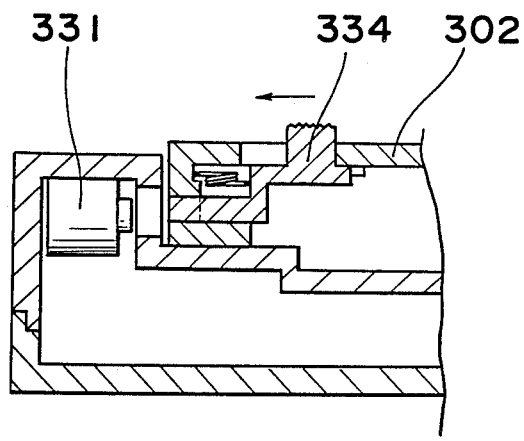
FIG. 34 is a vertical side elevational view of a modification of a switch of the disc cleaner of FIG. 21.

In accordance with the change in structure and position of the switch 331, the operating member 334 can also be changed to be in sliding structure or in turn-over structure. An example is seen in FIG. 34 in which the operating member 334 is adapted to slide to shift the switch 331. It is not always required that the operating member 334 and the switch 331 are separately disposed up and down, as in the above-described embodiment.

Figure 35:
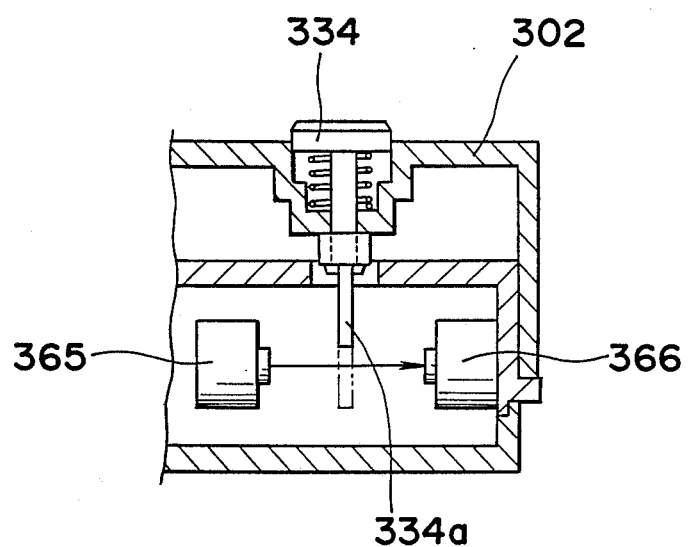
FIG. 35 is a vertical front elevational view of another modification of the switch.

FIG. 35 represents a modification of the switch 331 in a non-contact system. The switch is comprised of a light emitting member 365 and a light receiving element 366. After the lid 302 is closed, a light path connecting the elements 365 and 366 is shut off by the operating member 334 provided with the lid 302, thereby to close the passage for supply of power to the motor 320.

Apart from the switch of the above-described optical sensor type, the switch 331 can be in the non-contact system employing a lead switch. By way of example, a lead switch is provided within the main body 301, and a magnet for turning on the lead switch is provided in the operating member 334 of the lid 302, or vice versa. Then, by operating the operating member 334 after closing the lid 302, the lead switch is turned in the ON state to move the motor 320.

The lid 302 is not necessarily opened or closed through rocking motion, but it may be completely separated from the main body when it is opened or it may be opened or closed through sliding motion.

Referring to FIGS. 21 through 24, the cleaner body 21 has four divided cleaning members 321a at the side of the lid 302, each separately and radially disposed from the rotational center $O_2$ thereof. All of the divided cleaning members 321a are separated from each other at equal angles on the concentric circle at the lower surface side of the respective arm portions 339a radially extending outwardly from the rotational center $O_2$ of a cross cleaning base 339. More specifically, each of the divided cleaning members 321a is formed by an annular pad comprised of fluffy urethane and sponge, and fitting secured to a disc-shaped pad saucer 341. The pad saucer 341 is supported by a boss 342 at the lower surface side of the arm portion 339a so as to be vertically and rockingly movable and at the same time, the pad saucer 341 is always urged downwards by a spring 343 wound around the boss 342. It is to be noted here that the distance between one divided cleaning member 321a and another divided cleaning member 321a opposed to the one is set to be larger than the radius of the disc 303.

The rotating mechanism 322 which drives the cleaner body 321 is constructed as follows. A planet gear 344 in an annular shape and an input inner gear 345 are formed at the center of the upper surface and at the center of the lower surface of the cleaning base 339, respectively. On the other hand, a transparent window portion 302a formed in the window 302 so as to confirm the condition of the cleaning has a fixed inner gear 346 securely connected by a screw 347 to the inner surface thereof. The fixed inner gear 346 is in a meshed relation with the planet gear 344, and at the same time, is rotatably fitted into a central boss 348 of the fixed inner gear 346 by an end of a supporting plate 349. The other end of the supporting plate 349 is coupled by an eccentric pin 351 to a central boss 350 surrounded by the planet gear 344.

The rotating mechanism 322 at the side of the lid 302 is placed in such relation with respect to the input terminal 319 at the side of the main body casing 301 that when the lid is closed, the input terminal 319 is meshed with a part of the circumference of the input inner gear 345 of the rotating mechanism 322, while when the lid 302 is opened, the input gear 345 is detached from the output terminal 319.

Moreover, the cleaner body 321 is so placed with respect to the disc 303 on the mounting face 305 that, with the lid 302 being closed, the rotational center $O_2$ of the cleaning base 339 is at a position eccentric to the center $O_1$ of the disc 303, and furthermore the center $O_1$ of the disc is positioned between the divided cleaning members 321a opposed to each other.

Figure 27:
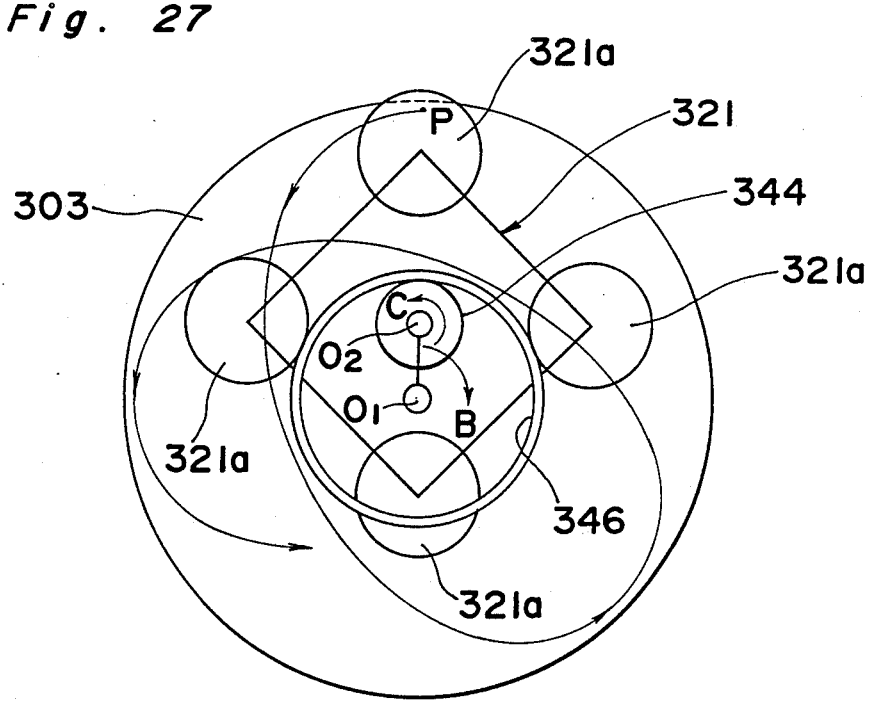
FIG. 27 is a diagram of the trace drawn by the cleaner body.

Accordingly, after the cleanser liquid is sprayed on the surface of the disc 303 horizontally put on the mat 306 on the mounting face 305, with the lid 302 opened, as shown in FIG. 22, then the lid 302 is completely closed, as shown in FIG. 21. Consequently, the input gear 345 of the rotating mechanism 322 is brought in engagement with the output terminal 319. At this time, if the operating knob 334 is pressed to turn on the switch 331, the motor 320 is rotated. Because of the rotation of the motor 320, the output terminal 319 is rotated, and accordingly the cleaner body 321 revolves around the center of the fixed inner gear 346, as it simultaneously rotates around the pin 351 of the cleaning base 339. The trace of one point P drawn by one divided cleaning member 321a at this time is as illustrated in FIG. 27. It is to be noted here that although the trace becomes different in accordance with the gear ratio of the planet gear 344 and the fixed inner gear 346, the trace shown in FIG. 27 is in the case where the gear ratio is about 1:3. The direction shown by an arrow B in FIG. 27 represents the revolutional direction, while that shown by an arrow C in FIG. 27 represents the rotational direction. As will be clear from the trace, each of the divided cleaning members 321a moves in the diametrical direction on the signal surface of the disc 303 for cleaning. Further, the cleaner body 321 is pressed into contact with the disc 303 in such a manner as to stride over the center $O_1$ of the disc 303, and therefore, the disc 303 is always held in the horizontal state on the mat 306, resulting in uniform cleaning of the signal surface of the disc 303. The cleaning condition can be observed through the transparent window portion 302a, but the engaging condition of the fixed inner gear 346 with the planet gear 344 is shielded by the fixed inner gear 346. Accordingly, only the cleaning condition can be viewed from the transparent window portion 302a.

Upon opening of the lid 302, the input inner gear 345 of the rotating mechanism 322 is disengaged from the output terminal 319, thereby to stop the rotation of the cleaner body 321. Therefore, at this time, the cleaner body 321 is able to be put onto or taken from the mounting face 305 of the disc 303 with much safety.

Figure 31:
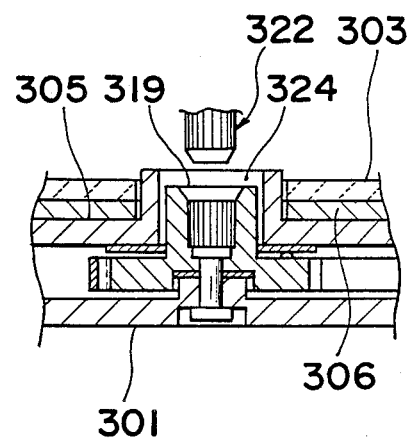
FIG. 31 is a cross sectional view of a modification of an output terminal in the disc cleaner of FIG. 21.

In FIG. 31, a modified embodiment of the output terminal 319 is shown, in which the output terminal 319 is exposed and sunk into the inside of the opening 324 of the mounting face 305, so that even when the output terminal 319 is erroneously rotated, with the lid 302 opened, the output terminal 319 is able to be prevented from being in touch with the disc 303, enhancing the safety of the disc.

Figure 32:
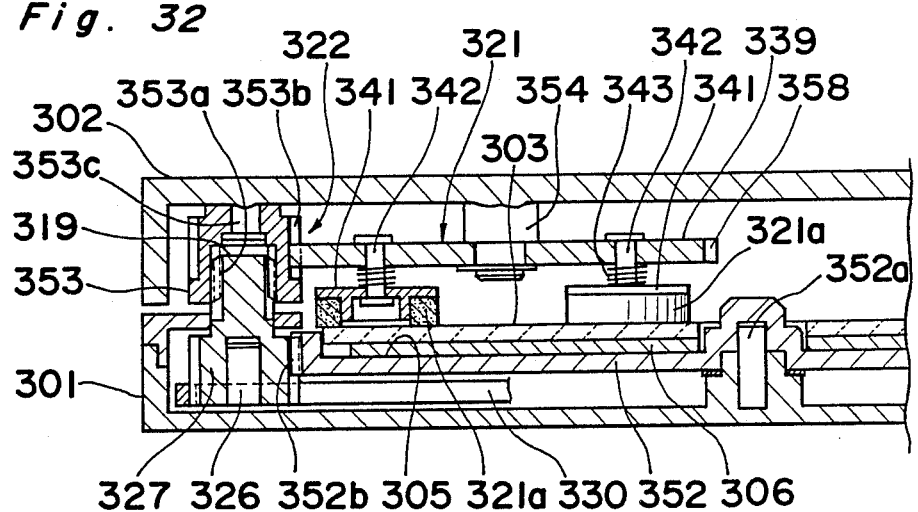
FIG. 32 is a cross sectional view of a modification of a driving part of the disc cleaner of FIG. 21.
Figure 33:
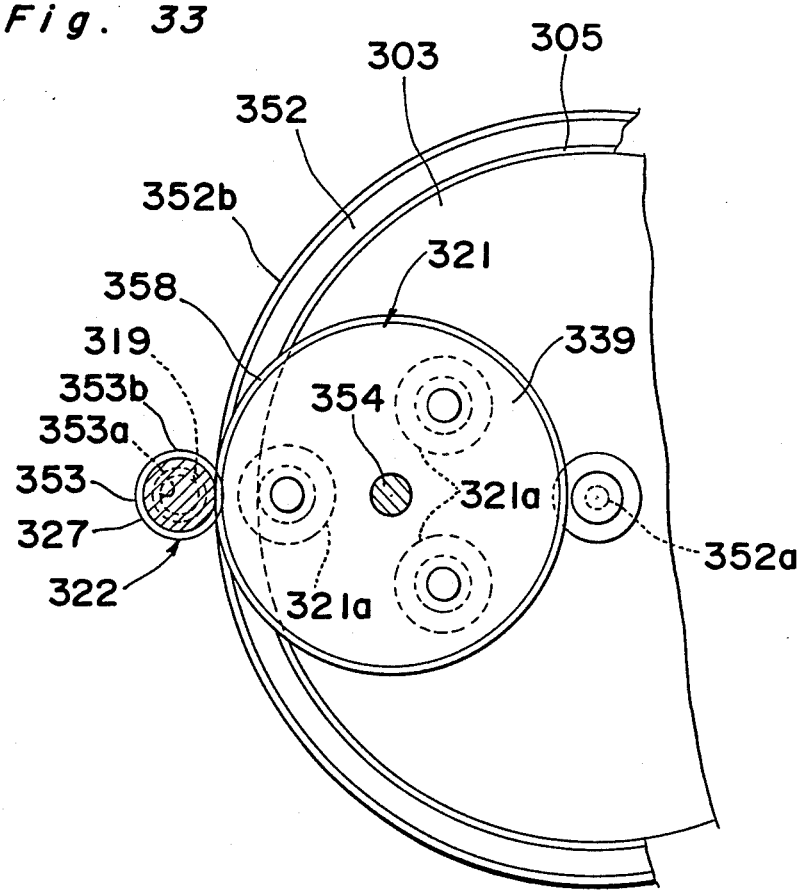
FIG. 33 is a plane view of the driving part of FIG. 32.

FIGS. 32 and 33 illustrate another embodiment of the driving part of the disc cleaner. The main body casing 301 shown therein has a disc-like mounting platform 352 with the mounting face 305 rotatably supported around a central shaft 352a, and at the same time, a gear 352b engraved in the outer periphery of the mounting platform 352. Within the main body casing 301, the driving gear 327 to be meshed with the gear 352b is rotatably supported on the driving shaft 326. Moreover, an upper end of the driving gear 327, which becomes the output terminal 319, projects to the side of the mounting platform 305. The driving gear 327 is transmitted with the rotation of the driving source 320 through the timing belt 330. Meanwhile, at the side of the lid 302, the input gear 353, having an inner gear 353a which is engageable with and disengageable from the output terminal 319, is supported on the inner surface of the lid 302 so as to be rotatable around the shaft 353c. Also, on the inner surface of the lid 302, there is supported in alignment with the input gear 353 the cleaning base 339 provided with divided cleaning members 321a so as to be rotatable around the shaft 354, with a tooth 358 formed in the outer peripheral surface of the base 339 being in mesh with the outer tooth 353b of the input gear 353. The input gear 353 and cleaning base 339 constitute the rotating mechanism 322.

In the foregoing construction, when the lid 302 is closed, the input gear 353 is engaged with the output terminal 319. The subsequent rotation of the output terminal 319 brings the mounting platform 352 with the disc 302 thereon to rotate around the shaft 352a, with simultaneous rotation of the input gear 353. Then, the cleaning base 339 is rotated around the shaft 354, and accordingly, the signal surface of the disc 303 is wiped off by the divided cleaning members 321a.

Figure 36A:
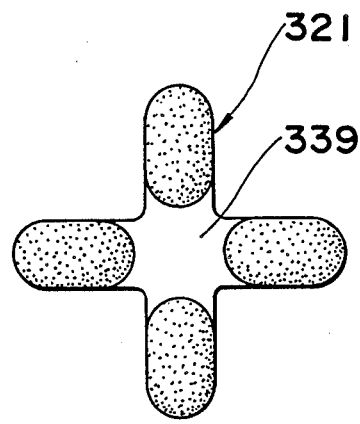
FIGS. 36(a) through 36(c) are plane views respectively showing a modification of a cleaner body.

Referring to FIG. 36(a), the cleaner body 321 shown therein according to a modified embodiment has protruding cleaning portions 321a each formed in an elliptical shape so as to accord with the shape of the respective arm portions 339a of the cleaning base 339.

Figure 36B:
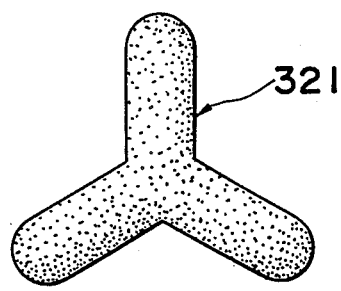
Figure 36C:
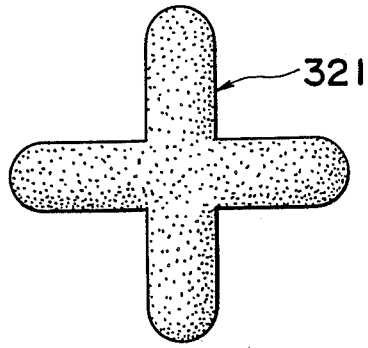
Figure 37:
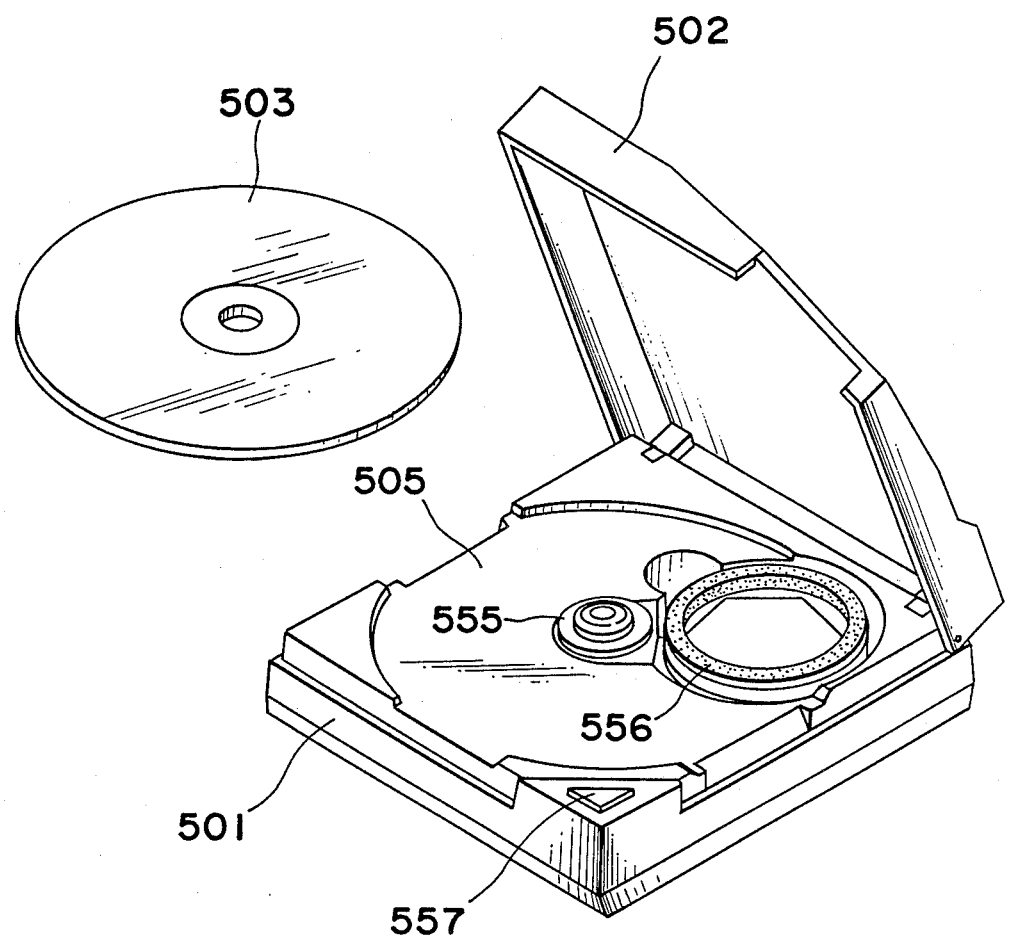
FIG. 37 is a perspective view of a prior art disc cleaner, with a lid being opened.
Figure 38:
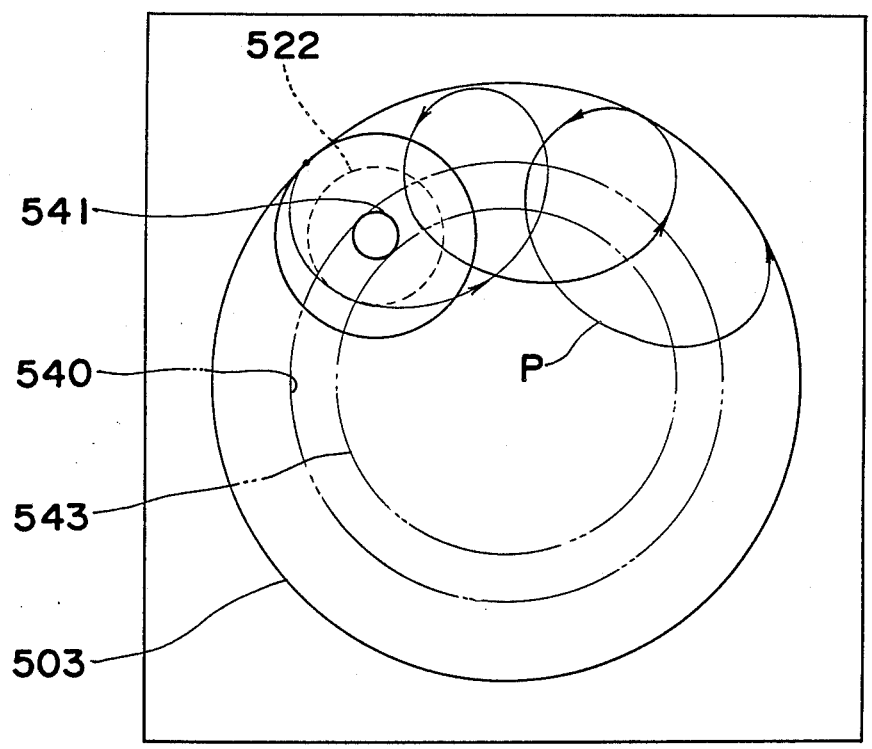
FIG. 38 is a plane view of a prior art disc cleaner.

In FIGS. 36(b) and 36(c), there are shown further modified embodiments of the cleaner body 321 which has three and four protruding cleaning portions 321a extending radially from the center of the cleaner body 321 and coupled with each other into one unit.

As has been described hereinabove, according to the disc cleaner of the fourth embodiment of the present invention, it is so arranged that the cleaner body 321 is never rotated without the lid 302 being closed. Therefore, one can handle the disc 303 safely even when the lid 302 is opened. Moreover, the disc cleaner according to the fourth embodiment of the present invention is advantageous in that the cleaning condition on the signal surface of the disc is able to be confirmed during the cleaning operation, and further, the cleaner body 321 is provided at the side of the lid 302 so as to be prevented as much as possible from being covered with dirt and dust.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:
1. A disc cleaner comprising:
   a body casing including a mounting platform provided in a recessed portion of a main surface of said body casing for placing an information storage disc to be cleaned thereon,
   a driving means accommodated within a portion of said body casing including a driving gear which projects from the center of said mounting platform, passing through a central opening in said disc to be placed on said platform, said disc adapted to abe driven by said driving means to rotate around a shaft of said driving gear,
   a lid, one end of which is pivotally mounted on said body casing, freely opening and closing so as to uncover and cover said main surface of said body casing, said lid having a cleaner body mounted within the inner surface thereof, and
   a rotating mechanism provided on said lid for transmitting the rotation of said driving gear to said cleaner body, such that said driving gear is arranged to be disengaged from or connected to said rotating mechanism in accordance with the opening or closing of said lid, with the disc having its surface to be cleaned, the signal surface, turned upward and fixed on said mounting platform,
   whereby said cleaner body mounted within the inner surface of said lid faces said disc placed on said platform when said lid is closed, said cleaner body being provided with said lid in a manner such that said cleaner body is rotated by said driving gear when said lid is in a closed state about said shaft of said driving gear, while said rotating mechanism is also being driven by said driving gear such that said cleaner body is further rotated while revolving about said shaft of said driving gear.

2. The disc cleaner of claim 1, further including a motor means for powering said driving gear.

3. The disc cleaner of claim 2, further including belt means for transmitting the power of said motor means to said driving gear.

4. The disc cleaner of claim 1, wherein said rotating mechanism for rotating and revolving said cleaner body includes:
first gear means secured at the inner surface of said lid means;
rotary disc means supporting said cleaner body;
second gear means projecting from said rotary disc means;
input gear means, formed in a outer peripheral edge of said rotary disc means and operatively engaged with said driving gear means, for being driven by said driving gear means to rotate said rotary disc means, said cleaner body, and said second gear means; and
means for operatively connecting said second gear means with said first gear means to revolve said rotary disc means.

5. The disc cleaner of claim 4, wherein said means for operatively connecting said first and second gear means includes a timing belt and a supporting plate.

6. The disc cleaner of claim 5, further including a supporting pin, connected to one end of said supporting plate, for supporting said second gear means.

7. The disc cleaner of claim 6, further including mounting plate means for connecting said rotary disc means with said cleaner body.

8. The disc cleaner of claim 7, wherein said mounting plate means is connected to the lower end of said supporting pin so as to be movable in the vertical direction.

9. The disc cleaner of claim 7, further including first elastic members inserted between said rotary disc means and said mounting plate means for urging said mounting plate means downwards.

10. The disc cleaner of claim 9, wherein said cleaner body is located at a lower surface side of said mounting plate means, and is arranged to contact the surface of said disc to be cleaned at a predetermined pressure due to the urging of said first elastic members when said lid means is positioned in a closed condition relative to said main casing.

11. The disc cleaner of claim 9, wherein said first elastic members are coiled springs.

12. The disc cleaner of claim 9, wherein said rotary disc means further includes a surrounding wall formed along an outer peripheral edge of a lower surface thereof so as to surround the outer periphery of said first elastic members.

13. The disc cleaner of claim 12, wherein said mounting plate means has a surrounding wall formed along an outer peripheral edge of the upper surface thereof.

14. The disc cleaner of claim 13, wherein said surrounding wall of said mounting plate means is smaller in diameter than said surrounding wall of said rotary disc means so that said surrounding wall of said mounting plate means is fitted inside said surrounding wall of said rotary disc means.

15. The disc cleaner of claim 13, wherein said surrounding wall of said rotary disc means and said surrounding wall of said mounting plate means commonly surround the outer peripheries of said first elastic members.

16. The disc cleaner of claim 13, wherein a surrounding wall of said rotary disc means and a surrounding wall of said mounting plate means is provided for each of said first elastic members.

17. The disc cleaner of claim 12, wherein said surrounding wall of said rotary disc means has said input gear means formed therein.

18. The disc cleaner of claim 17, wherein said cleaner body includes a second elastic member located at the lower surface of said mounting plate means, and a cleaning layer attached to said second elastic member.

19. The disc cleaner of claim 18, wherein said second elastic member is constructed of cellular plastic or sponge rubber, and has an elasticity greater than said first elastic member.

20. The disc cleaner of claim 18, further including a cleaning base means having one surface detachably connected to the lower surface of said mounting plate means and the other surface connected to the upper surface of said second elastic member.

21. The disc cleaner of claim 20, further including a means for detachably connecting said cleaning base means to the lower surface of said mounting plate means.

22. The disc cleaner of claim 21, further including an engaging claw at the lower surface of said mounting plate means.

23. The disc cleaner of claim 22, wherein said engaging claw is engaged with a recessed groove formed in said cleaning base means as said cleaning base means is rotated.

24. The disc cleaner of claim 20, further including an arm means, provided on said mounting plate means for preventing said cleaning base means from rotating in a loose manner, and wherein said cleaning base means is formed with a recess for engaging said arm means simultaneous with said connecting of said cleaning base means to said mounting plate means.

25. The disc cleaner of claim 9, wherein said first elastic members are coiled springs, surrounding said supporting pin in an interval between said rotary disc means and said mounting plate means.

26. The disc cleaner of claim 4, wherein the direction of rotation of said rotary disc means is opposite to its direction of revolution.

27. The disc cleaner of claim 1, further comprising a switch means accommodated within said body casing for activating said driving means, and a switching button arranged on said lid for actuating said switch means in such a manner that said switch means is rendered to be operable by the switching button immediately upon closing of said lid.

28. The disc cleaner of claim 27, wherein said switch means is positioned so as not to turn off, once it is turned on, before or just immediately before the lid is opened to such an angle that the disc cleaner is separated from the disc.

29. The disc cleaner of claim 28, further comprising a spring means inserted between the body casing and the lid so as to urge the lid in a direction to open the lid against the body casing.

30. The disc cleaner of claim 1, further including a rotary disc supported on the inner surface of said lid, a mounting plate vertically, movably provided at a lower surface of said rotary disc, and a first elastic member inserted between said rotary disc and said mounting plate so as to urge said mounting plate downwards, the cleaner body being detachably provided at the lower surface of said mounting plate for cleaning said disc.

31. The disc cleaner of claim 1, further including pads provided on said cleaner body and arranged in a loop shape, and an attitude controlling mechanism which rotates said cleaner body along a circular trace, so that said cleaner body cleans the surface of said disc as it rotates while revolving around the revolutional center O at the center of the disc, the direction of the cleaner body being set reverse to the revolutional direction thereof, the rotational cycle and the revolutional cycle of the cleaner body being set that a trace P drawn by the cleaning pads every one rotational cycle has a starting point Q at the peripheral edge of said disc, and a terminal R approximately opposite to said starting point Q at the peripheral edge of said disc.

32. The disc cleaner of claim 31, wherein a limit line S which is a diametrical line at right angles to the diametrical line of the disc passing through the starting point Q is interposed between the starting point Q and the terminal R opposed to the starting point Q.

33. The disc cleaner of claim 31, wherein the rotational cycle of the cleaner body per one revolutional cycle thereof is set to be a decimal value.

34. The disc cleaner of claim 31, wherein a cleaner body which rotates while revolving on the signal surface of said disc is arranged to have its rotational center $O_2$ at a position eccentric to said disc, with the center $O_1$ of said disc positioned within the area of the rotation.

35. The disc cleaner as defined in claim 31, wherein a cleaner body which rotates while revolving on the signal surface of said disc is arranged to have its rotational center $O_2$ at a position eccentric to said disc, with the center $O_1$ of said disc positioned within the area of the rotation, and is further arranged to have plurality of protruding cleaning members each extending radially from said rotational center $O_2$.

* * * * *